United States Patent
Jiang

(10) Patent No.: US 11,546,082 B2
(45) Date of Patent: Jan. 3, 2023

(54) METHODS AND APPARATUSES FOR SETTING BUFFER STATUS REPORT FORMAT

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 145 days.

(21) Appl. No.: 17/057,642

(22) PCT Filed: May 21, 2018

(86) PCT No.: PCT/CN2018/087698
§ 371 (c)(1),
(2) Date: Nov. 20, 2020

(87) PCT Pub. No.: WO2019/222884
PCT Pub. Date: Nov. 28, 2019

(65) Prior Publication Data
US 2021/0203436 A1 Jul. 1, 2021

(51) Int. Cl.
*H04L 1/00* (2006.01)
(52) U.S. Cl.
CPC ............ *H04L 1/003* (2013.01); *H04L 1/0027* (2013.01)
(58) Field of Classification Search
CPC ..... H04L 1/003; H04L 1/0027; H04L 5/0053; H04W 72/1284
See application file for complete search history.

(56) References Cited

U.S. PATENT DOCUMENTS

| 10,750,542 | B2* | 8/2020 | Fujishiro | H04W 76/10 |
| 2010/0322086 | A1 | 12/2010 | Harris et al. | |
| 2013/0107722 | A1* | 5/2013 | Huang | H04W 72/048 370/241 |
| 2017/0006628 | A1 | 1/2017 | Takahashi et al. | |
| 2020/0045577 | A1* | 2/2020 | Yu | H04W 28/0278 |
| 2020/0236580 | A1* | 7/2020 | Kim | H04W 72/1284 |

(Continued)

FOREIGN PATENT DOCUMENTS

| CN | 101572652 A | 11/2009 |
| CN | 101588227 A | 11/2009 |

(Continued)

OTHER PUBLICATIONS

International Search Report of PCT Application No. PCT/CN2018/087698 dated Jan. 30, 2019 with English translation (4p).

(Continued)

*Primary Examiner* — Ivan O Latorre
(74) *Attorney, Agent, or Firm* — Arch & Lake LLP

(57) ABSTRACT

The present disclosure relates to a method of setting a buffer status report (BSR) format including: in response to triggering a BSR by a UE, determining an amount of data buffered in a buffer corresponding to a logical channel group configured to transmit the data; and setting a format for the BSR based on the amount of the data buffered in the buffer. A number of bits in the BSR of the format is positively correlated with the amount of the data buffered in the buffer, and the bits indicate the amount of the data buffered in the buffer.

19 Claims, 16 Drawing Sheets

(56) References Cited

U.S. PATENT DOCUMENTS

| | | | |
|---|---|---|---|
| 2020/0275308 A1* | 8/2020 | Liu | H04L 1/1825 |
| 2020/0296620 A1* | 9/2020 | Tang | H04W 28/0278 |
| 2020/0296752 A1* | 9/2020 | Baek | H04W 28/0278 |
| 2021/0203436 A1* | 7/2021 | Jiang | H04W 72/1284 |
| 2021/0274530 A1* | 9/2021 | Sebire | H04W 28/06 |

FOREIGN PATENT DOCUMENTS

| | | | |
|---|---|---|---|
| CN | 101697630 A | 4/2010 |
| CN | 102291771 A | 12/2011 |
| CN | 102291772 A | 12/2011 |
| CN | 103249090 A | 8/2013 |
| CN | 105491619 A | 4/2016 |
| CN | 107889144 A | 4/2018 |

OTHER PUBLICATIONS

First Office Action issued in Chinese Application No. 201880000679.0 dated Jul. 2, 2020 with English translation, (13p).

Intellectual property India, Office Action Issued in Application No. 202047053562, dated Dec. 14, 2021, (7p).

Extended European Search Report Issued in EP Application No. 18919873.2, dated Apr. 29, 2021, (9p).

ISA State Intellectual Property Office of the People's Republic of China, Written Opinion of the International Searching Authority Issued in Application No. PCT/CN2018/087698, dated Jan. 30, 2019, WIPO, (9p).

Huawei, China Telecom, HiSilicon, "BSR for one LCG case", 3GPP TSG-RAN WG2 #102, Busan, Korea, R2-1807443, Revision of RZ-1804418, May 21-25, 2018, (6p).

Ericsson, "Aspects of BSR format and tables", 3GPP TSG-RAN WG2 #99bis, Prague, Czech Republic, Tdoc R2-1711181, Oct. 9-13, 2017, (7p).

Huawei, HiSilicon, "Design principle of BS table", 3GPP TSG-RAN WG2#99, Berlin, Germany, R2-1707724, Aug. 21-25, 2017, (5p).

\* cited by examiner

METHODS AND APPARATUSES FOR SETTING BUFFER STATUS REPORT FORMAT

CROSS-REFERENCE TO RELATED APPLICATION

This application is the national phase of International Application No. PCT/CN2018/087698, filed on May 21, 2018, the disclosure of which is incorporated herein by reference in its entirety for all purposes.

TECHNICAL FIELD

The present disclosure relates to the field of communication technology, in particular, relates to methods and apparatuses for setting a buffer status report format, methods and apparatuses for sending a reference data amount, electronic devices, and computer-readable storage media.

BACKGROUND

In a related art, a buffer status report (BSR) sent by a user equipment (UE) is mainly of two formats including a short format and a long format. In particular, a short-format BSR uses 5 bits to indicate an amount of data buffered in a buffer, while a long-format BSR 8 bits.

In addition, according to related communication protocols, with respect to the BSR of a certain type, the UE only sent the short-format BSR if only one logical channel group (LCG) has data available for transmission. In this case, when the buffer corresponding to the LCG has buffered a great amount of data, a span between the amounts of data buffered in the buffer which are indicated by the 5 bits of the short-format BSR will be relatively large.

For example, as naming a value corresponding to the 5 bits as BS in short, the maximum BS is 31. BS=19 indicates a data amount of 3909 bytes, and BS=20 indicates a data amount of 5446 bytes. The difference between the indicated data amount may be more than 1537 bytes even if the difference between the two corresponding BSs is only 1. Supposing that the amount of the data buffered in the buffer is 3910 bytes, in order to inform a base station to allocate uplink resources for transmitting the 3910 bytes, the UE has to send a short-format BSR with BS=20. Accordingly, the base station will allocate uplink resources in a way that the UE is allowed to transmit 5446 bytes, while the UE actually only requires uplink resources to transmit 3910 bytes, which may result in a waste of uplink resources with more than 1,000 bytes.

SUMMARY

In view of the above, the present disclosure provides methods and apparatuses for setting a BSR format, methods and apparatuses for sending a reference data amount, electronic devices, and computer-readable storage media.

According to a first aspect of the present disclosure, a method of setting a buffer status report format includes: triggering, by a UE, a BSR; in response to triggering the BSR, determining, by the UE, an amount of data buffered in a buffer corresponding to a logical channel group configured to transmit the data; and setting, by the UE, a format for the BSR based on the amount of the data buffered in the buffer, wherein a number of bits in the BSR of the format is positively correlated with the amount of the data buffered in the buffer, and the bits indicate the amount of the data buffered in the buffer.

According to a second aspect of the present disclosure, a method of sending a reference data amount includes: sending, by a base station, indication information to a UE, wherein the indication information includes at least one reference data amount and enables the UE to determine a plurality of data amount ranges based on the at least one reference data amount, wherein a format for a BSR to be sent is determined by the UE based on the data amount ranges; and receiving, by the base station, the BSR sent by the UE.

According to a third aspect of the present disclosure, a user equipment includes: a processor; and a memory for storing instructions executable by the processor; where the processor is configured to perform the method according to the first aspect of the present disclosure.

According to a fourth aspect of the present disclosure, a base station includes: a processor; and a memory for storing instructions executable by the processor; where the processor is configured to perform the method according to the second aspect of the present disclosure.

BRIEF DESCRIPTION OF THE DRAWINGS

The drawings related to the description of the examples will be briefly introduced to explain the technical solutions provided by the embodiments of this disclosure more clearly. It is obvious that, the drawings in the following description illustrate only some examples of the present disclosure, and based on these drawings, those of ordinary skill in the art may obtain other drawings without creative work.

DETAILED DESCRIPTION OF THE EMBODIMENTS

The following, in conjunction with the drawings of the present disclosure, will clearly and completely describe the technical solutions provided in the embodiments of the present disclosure. It is obvious that the described examples are partial examples, not all implementations of the present disclosure. Based on the examples provided in the present disclosure, all of other examples, which can be obtained by those of ordinary skill in the art without creative work, shall fall within the protection scope of this application.

Figure 1:
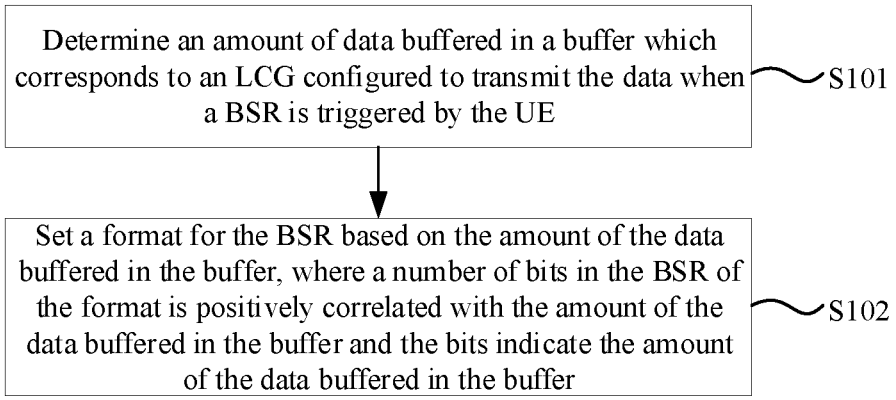
FIG. 1 is a schematic flowchart illustrating a method of setting a BSR format according to an example of the present disclosure.

FIG. 1 is a schematic flowchart illustrating a method of setting a BSR format according to an example of the present disclosure. According to this example, the method of setting a BSR format is applicable to a UE. The UE may be an electronic device such as a mobile and a tablet, and may communicate with a base station.

As shown in FIG. 1, the method of setting a BSR format may include the following steps:

at step S101, an amount of data buffered or stored in a buffer which corresponds to an LCG configured to transmit the data is determined when a BSR is triggered by the UE; and at step S102, a format for the BSR is set based on the amount of the data buffered in the buffer, where a number of bits in the BSR of the format is positively correlated with the amount of the data buffered in the buffer, and the bits indicate the amount of the data buffered in the buffer.

In one or more embodiments, by setting a BSR format based on an amount of data buffered in a buffer, a number of the bits, that are used to indicate the amount of the data buffered in the buffer in the BSR of the set format, is positively correlated with the amount of the data buffered in the buffer. That is, the greater the amount of the data buffered in the buffer is, the larger the number of the bits used to indicate the amount of the data buffered in the buffer in the BSR will be; while the less the amount of the data buffered in the buffer is, the smaller the number of the bits used to indicate the amount of the data buffered in the buffer in the BSR will be. Therefore, in a case where the buffer buffers a great amount of data, a span between data amounts corresponding to the values of BS, which correspond to the bits used to indicate the amount of the data buffered in the buffer in the BSR, maybe relatively narrow, so that the uplink resources, allocated by a base station for a UE based on the BS in the BSR, will never exceed the uplink resources required by the UE by very much, thereby reducing a waste of uplink resources.

In one or more embodiments, the format for the BSR may be set by determining a relationship between the amount of the data buffered in the buffer and one first reference data amount. For example, the first reference data amount may be 1000-bytes. Here, the format for the BSR may be set to a short format in a case where the amount of the data buffered in the buffer is less than or equal to 1000 bytes, in which the number of the bits used to indicate the amount of the data buffered in the buffer is 5, while to a long format in a case where the amount of the data buffered in the buffer is greater than 1000 bytes, in which the number of the bits used to indicate the amount of the data buffered in the buffer is 8.

Accordingly, when the amount of the data is 3910 bytes under the situation described in the background, the format for the BSR may be set to the long format since 3910 is greater than 1000. The BS in the BSR of the long format corresponds to one-eighth the data amount span that the BS in the BSR of the short format corresponds to, because the BSR of the long format uses 8 bits, i.e., 256 pieces of BS to indicate the amount of the data buffered in the buffer but the BSR of the short format uses 5 bits, i.e., 32 pieces of BS. Supposing that the data amount span corresponding to the BS in the BSR of the short format is 1537 bytes as described in the background, the data amount span corresponding to the BS in the BSR of the long format is about 192 bytes, that is, every change of the BS by 1 corresponds to a change of the data amount by 192 bytes. Thus, even if the base station over-allocates the uplink resources based on the received BSR, the excess of the allocated uplink resources is no more than 192 bytes, thereby reducing a waste of uplink resources.

Figure 2:
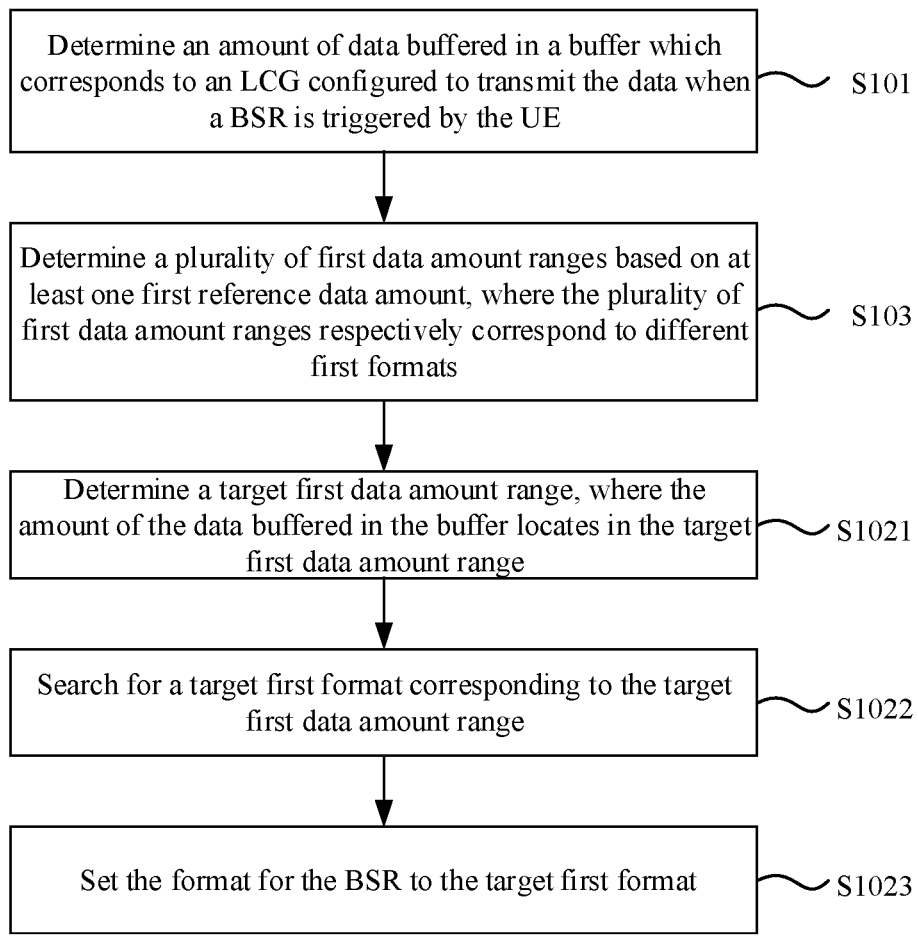
FIG. 2 is a schematic flowchart illustrating another method of setting a BSR format according to an example of the present disclosure.

FIG. 2 is a schematic flowchart illustrating another method of setting a BSR format according to an example of the present disclosure. As shown in FIG. 2, on the basis of the example shown in FIG. 1, the method further includes:

at step S103, before setting the format for the BSR based on the amount of the data buffered in the buffer, a plurality of first data amount ranges are determined based on at least one first reference data amount, where the plurality of first data amount ranges respectively correspond to different first formats.

Accordingly, the step that the format for the BSR is set based on the amount of the data buffered in the buffer includes:

at step S1021, a target first data amount range is determined, where that the amount of the data buffered in the buffer locates in target first data amount range;

at step S1022, a target first format corresponding to the target first data amount range is searched for; and at step S1023, the format for the BSR is set to the target first format.

In one or more embodiments, the plurality of first data amount ranges may be determined based on the at least one first reference data amount. For example, the at least one first reference data amount includes a first reference data amount A, and then two first data amount ranges can be determined: 0 to A, and A to positive infinity. As another example, the at least one first reference data amount includes first reference data amounts A and B and A is smaller than B, then three first data amount ranges can be determined: 0 to A, A to B, and B to positive infinity. The number of the first reference data amount s and the value of each first reference data amount may be set as required, and will not be repeated here.

In one or more embodiments, after determining the plurality of first data amount ranges, an association relationship between the first data amount ranges and the first formats may be established. The association relationship may be established by the UE, or be established and sent by the base station to the UE. Further, after determining the target first data amount range that the amount of the data buffered in the buffer locates in, the UE may determine the target first format corresponding to the target first data amount range based on the association relationship between the first data amount ranges and the first formats, and then set the format for the BSR to the target first format.

In one or more embodiments, the target first format is not limited to the short format and the long format. That is, in the BSR, the number of the bits used to indicate the amount of the data buffered in the buffer is not limited to 5 and 8, and may be expanded as required.

Figure 3:
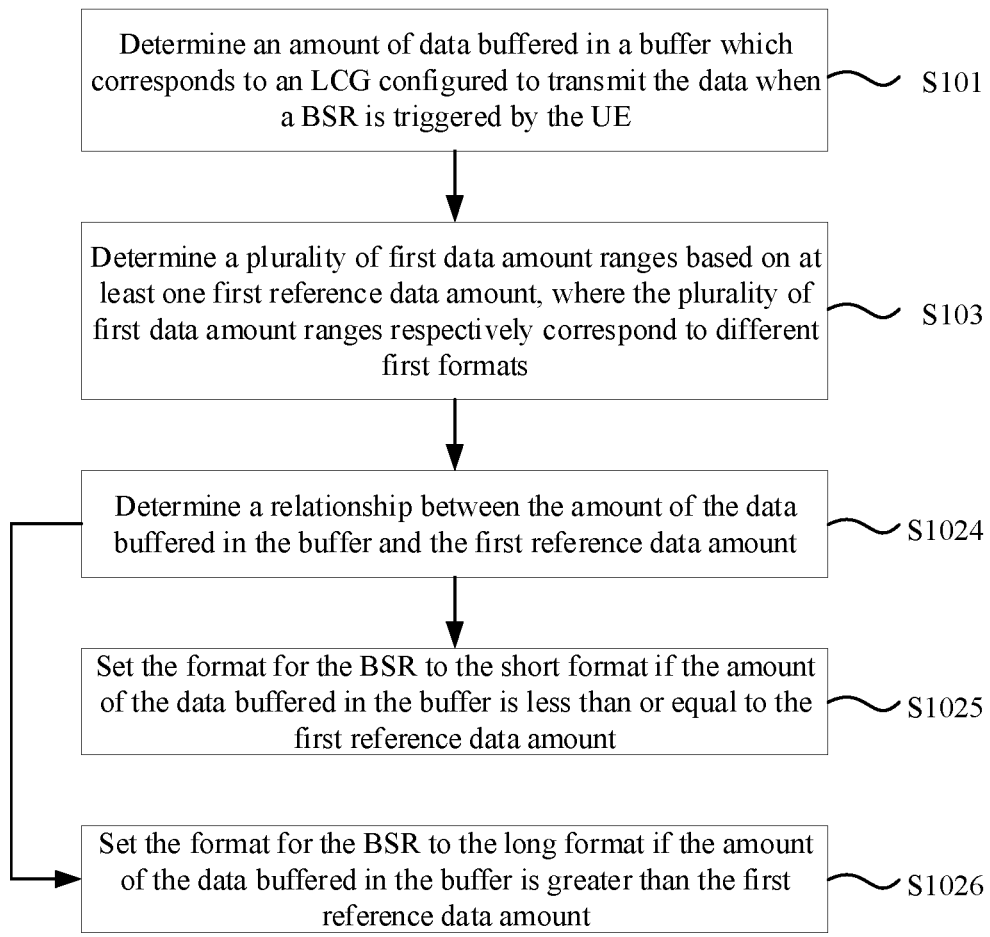
FIG. 3 is a schematic flowchart illustrating another method of setting a BSR format according to an example of the present disclosure.

FIG. 3 is a schematic flowchart illustrating another method of setting a BSR format according to an example of the present disclosure. As shown in FIG. 3, on the basis of the example shown in FIG. 2, the at least one first reference data amount includes one first reference data amount, and the step that the format for the BSR is set based on the amount of the data buffered in the buffer includes:

at step S1024, a relationship between the amount of the data buffered in the buffer and the first reference data amount is determined;

at step S1025, the format for the BSR is set to the short format if the amount of the data buffered in the buffer is less than or equal to the first reference data amount; and at step S1026, the format for the BSR is set to the long format if the amount of the data buffered in the buffer is greater than the first reference data amount.

In one or more embodiments, in a case where the at least one first reference data amount includes one first reference data amount, two first data amount ranges can be determined: one range that is less than or equal to the first reference data amount, and the other range that is greater than the first reference data amount. Accordingly, the format for the BSR may be set to the short format in the case where the amount of the data buffered in the buffer is less than or equal to the first reference data amount, while set to the long format in the case where the amount of the data buffered in the buffer is greater than the first reference data amount. Since the short format and the long format currently exist, it is not necessary to expand the BSR formats, which helps simplify the process of setting the BSR format.

Figure 4:
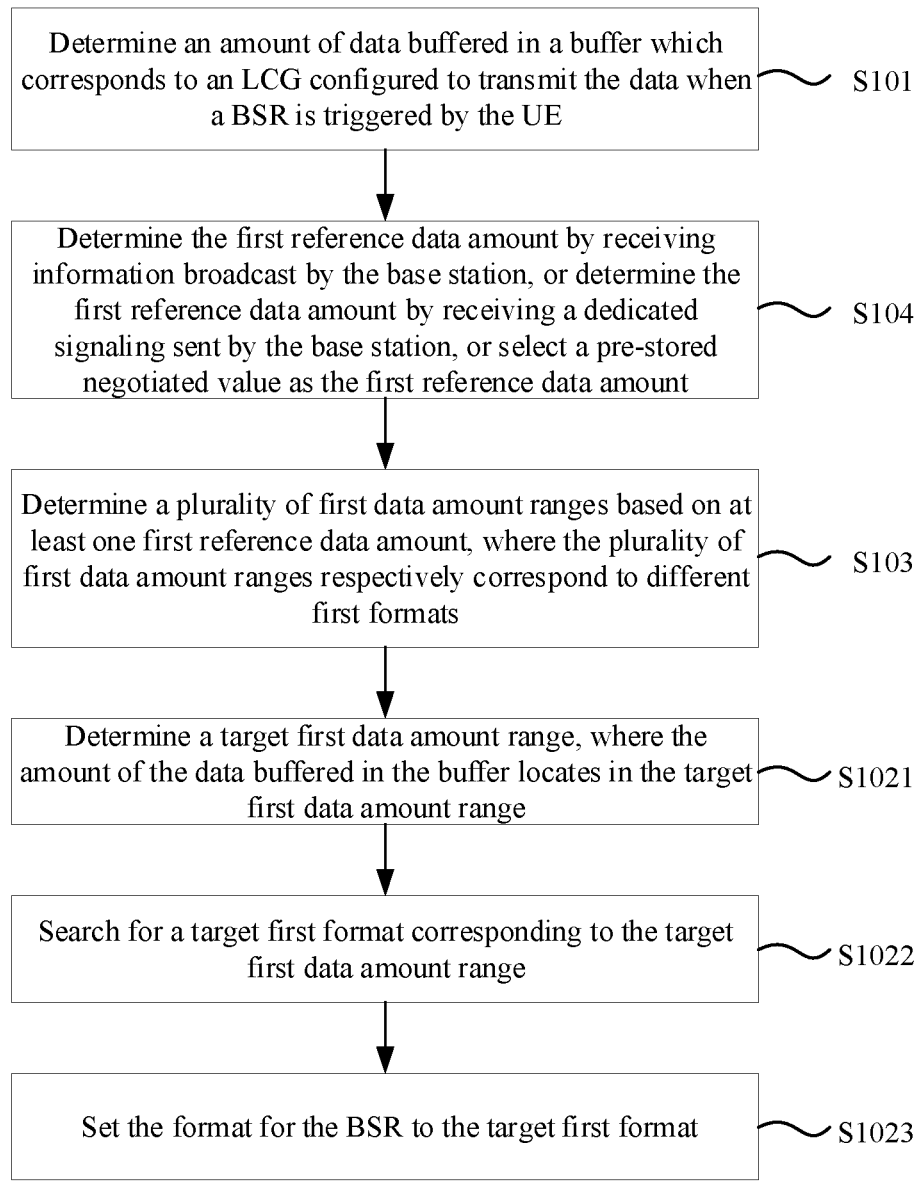
FIG. 4 is a schematic flowchart illustrating another method of setting a BSR format according to an example of the present disclosure.

FIG. 4 is a schematic flowchart illustrating another method of setting a BSR format according to an example of the present disclosure. As shown in FIG. 4, on the basis of the example shown in FIG. 2, the method further includes:

at step S104, before determining the plurality of first data amount ranges based on the at least one first reference data amount, the first reference data amount is determined by receiving information broadcast by the base station, or the first reference data amount is determined by receiving a dedicated signaling sent by the base station, or a pre-stored negotiated value is selected as the first reference data amount.

In one or more embodiments, the base station may send the first reference data amount to the UE through broadcasting, and the UE may determine the first reference data amount by receiving the information broadcast by the base station.

In one or more embodiments, the base station may send the dedicated signaling carrying the first reference data amount, and the UE may determine the first reference data amount by receiving the dedicated signaling sent by the base station. In particular, the dedicated signaling may be sent through a physical downlink control channel, a Radio Resource Control (RRC) message, or a Media Access Control Layer Control Unit (MAC CE).

In one or more embodiments, the base station may negotiate the first reference data amount with the UE in advance. For example, a negotiated value is set in accordance with a communication protocol and is stored by the UE in advance, and the UE may select the pre-stored negotiated value as the first reference data amount after triggering the BSR.

Figure 5:
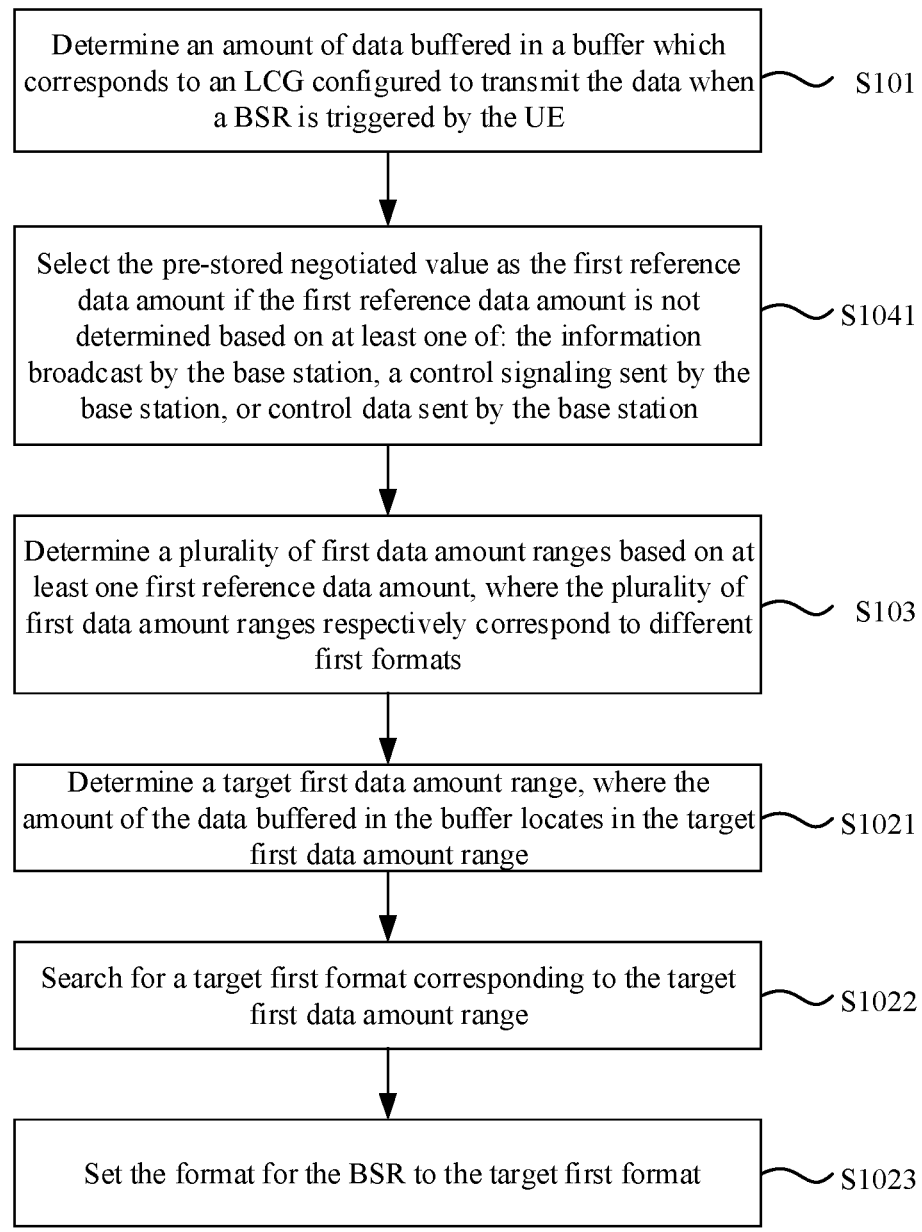
FIG. 5 is a schematic flowchart illustrating another method of setting a BSR format according to an example of the present disclosure.

FIG. 5 is a schematic flowchart illustrating another method of setting a BSR format according to an example of the present disclosure. As shown in FIG. 5, on the basis of the example shown in FIG. 4, the step that the first reference data amount is determined by receiving information broadcast by the base station, or the first reference data amount is determined by receiving a dedicated signaling sent by the base station, or a pre-stored negotiated value is selected as the first reference data amount, includes:

at step S1041, the pre-stored negotiated value is selected as the first reference data amount if the first reference data amount is not determined based on at least one of: the information broadcast by the base station, a control signaling sent by the base station, or control data sent by the base station.

In one or more embodiments, the pre-stored negotiated value may be selected as the first reference data amount in a case where the first reference data amount is not determined based on the information broadcast by the base station, or the first reference data amount is not determined based on the control signaling sent by the base station, or the first reference data amount is not determined based on the control data sent by the base station. Or, the pre-stored negotiated value may be selected as the first reference data amount in a case where the first reference data amount is not determined based on the information broadcast by the base station, the first reference data amount is not determined based on the control signaling sent by the base station, and the first reference data amount is not determined based on the control data sent by the base station. For the above two cases, in particular, based on which of them to select the pre-stored negotiated value as the first reference data amount, may be set as required.

Figure 6:
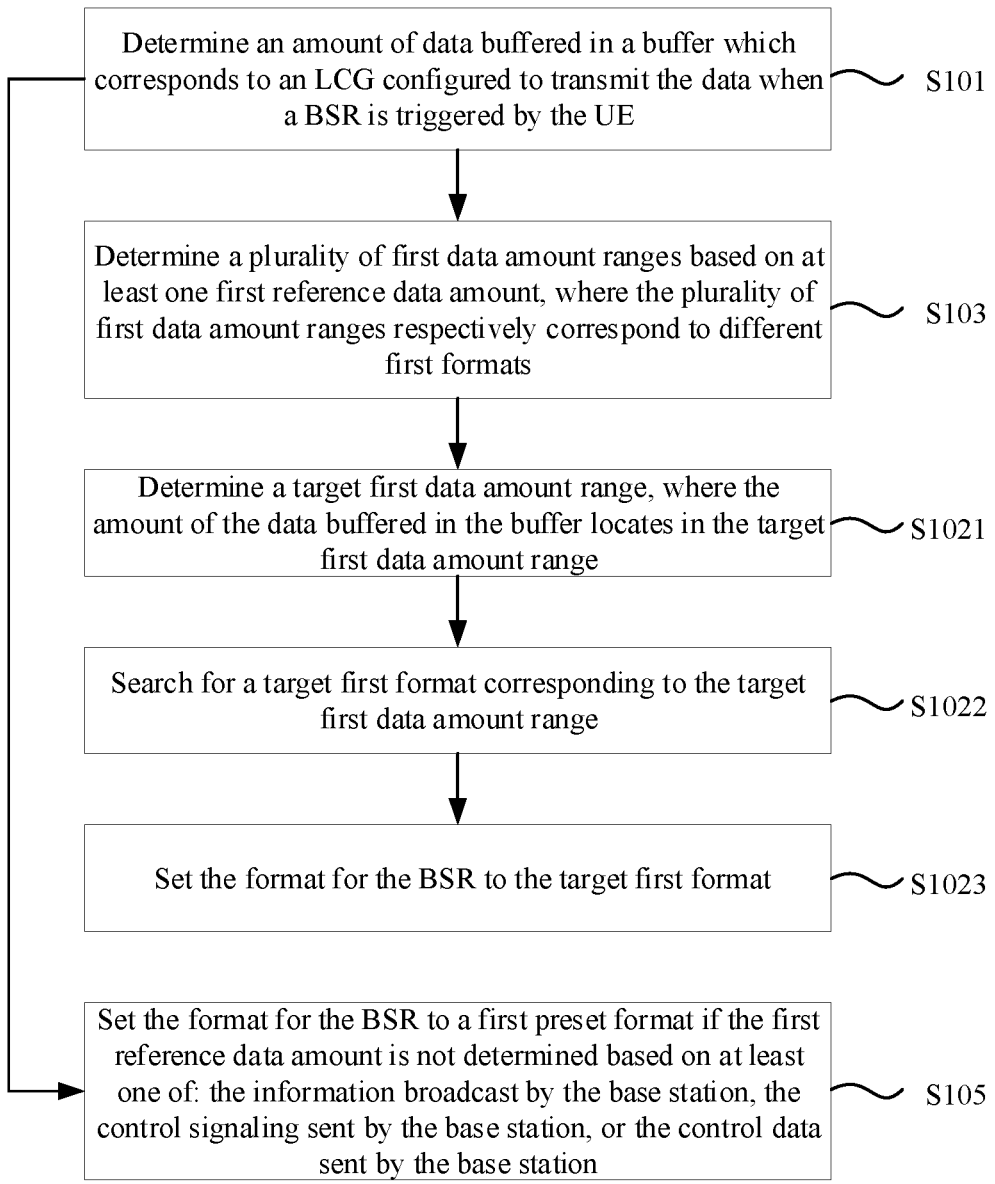
FIG. 6 is a schematic flowchart illustrating another method of setting a BSR format according to an example of the present disclosure.

FIG. 6 is a schematic flowchart illustrating another method of setting a BSR format according to an example of the present disclosure. As shown in FIG. 6, on the basis of the example shown in FIG. 2, the method further includes:

at step S105, the format for the BSR is set to a first preset format if the first reference data amount is not determined based on at least one of: the information broadcast by the base station, the control signaling sent by the base station, or the control data sent by the base station.

In one or more embodiments, the format for the BSR may be set to a first preset format in a case where the first reference data amount is not determined based on the information broadcast by the base station, or the first reference data amount is not determined based on the control signaling sent by the base station, or the first reference data amount is not determined based on the control data sent by the base station. Or, the format for the BSR may be set to the first preset format in a case where the first reference data amount is not determined based on the information broadcast by the base station, the first reference data amount is not determined based on the control signaling sent by the base station, and the first reference data amount is not determined based on the control data sent by the base station. For the above two cases, in particular, based on which of them to set the format for the BSR to the first preset format, may be set as required. In addition, the first preset format may be instructed by the base station, or be selected by the UE itself. The number of the bits used to indicate the amount of the data buffered in the buffer in the first preset format may be set as required.

In one or more embodiments, the first preset format may be a format negotiated in advance by the UE and the base station, for example, the short format.

Figure 7:
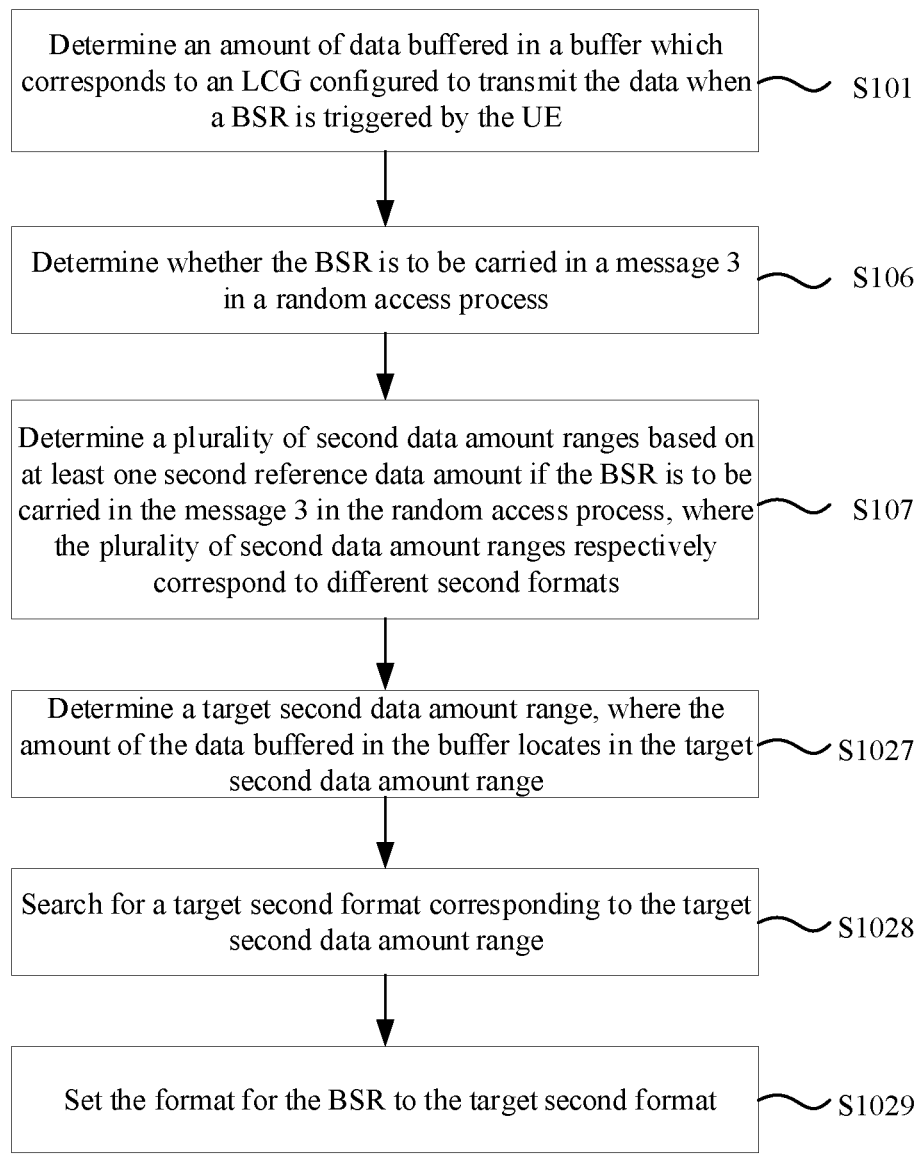
FIG. 7 is a schematic flowchart illustrating another method of setting a BSR format according to an example of the present disclosure.

FIG. 7 is a schematic flowchart illustrating another method of setting a BSR format according to an example of the present disclosure. As shown in FIG. 7, on the basis of the example shown in FIG. 2, the method further includes:

at step S106, before determining the plurality of first data amount ranges based on the at least one first reference data amount, it is determined whether the BSR is to be carried in a message 3 in a random access process; and at step S107, if the BSR is to be carried in the message 3 in the random access process, a plurality of second data amount ranges is determined based on at least one second reference data amount, where the plurality of second data amount ranges respectively correspond to different second formats.

Accordingly, the step that the format for the BSR is set based on the amount of the data buffered in the buffer includes:

at step S1027, a target second data amount range is determined, where the amount of the data buffered in the buffer locates in target second data amount range;

at step S1028, a target second format corresponding to the target second data amount range is searched for; and at step S1029, the format for the BSR is set to the target second format.

In one or more embodiments, during a random access process of the UE, the BSR may be carried in the message 3 (MSG3) in the random access process. Since the data amount of the MSG3 is mainly associated with a service data unit of common control channel (CCCH SDU) that is not used for data transmission, less uplink resources are requested, that is, the uplink resources requested by the UE to send MSG3 is less than the uplink resources requested by the UE to transmit the data. Thus, different standards may be adapted for the UE to set the format for the BSR with or without the BSR carried in the MSG3. That is, compared with the example shown in FIG. 2, the plurality of data amount ranges may be determined based on the at least one second reference data amount instead of the at least one first reference data amount. In addition, the second reference data amount may differ from first reference data amount, so that the plurality of second data amount ranges different from the plurality of first data amount ranges can be obtained.

For example, in a case where the at least one second reference data amount is one second reference data amount and the at least one first reference data amount is one first reference data amount, the second reference data amount may be smaller than the first reference data amount, so as to set the format for the BSR to the short format, which can avoid too large MSG3 since the number of the bits used to indicate the amount of the data buffered in the buffer in the BSR of the short format is smaller, i.e., the amount of data occupied by the BSR of the short format is less.

In one or more embodiments, the second reference data amount may have a same source as the first reference data amount. For example, the second reference data amount may be determined by receiving the information broadcast by the base station, or the second reference data amount may be determined by receiving the dedicated signaling sent by the base station, or the second reference data amount may be determined based on the value negotiated with the base station.

Figure 8:
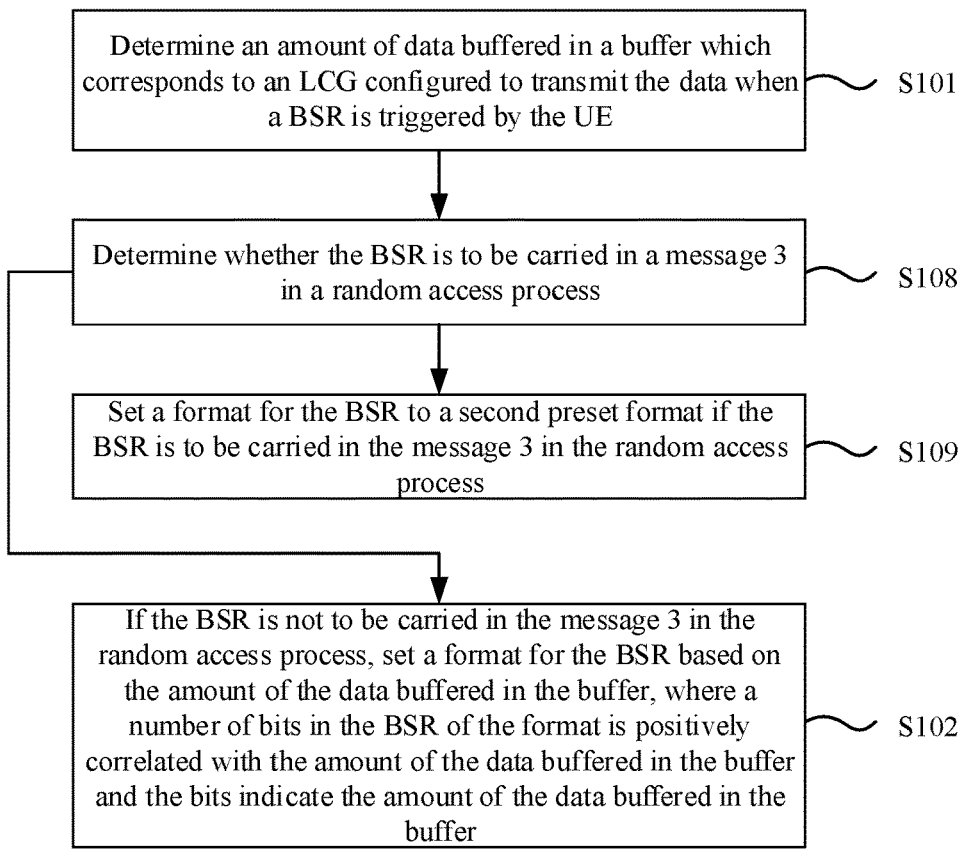
FIG. 8 is a schematic flowchart illustrating another method of setting a BSR format according to an example of the present disclosure.

FIG. 8 is a schematic flowchart illustrating another method of setting a BSR format according to an example of the present disclosure. As shown in FIG. 8, on the basis of the example shown in FIG. 2, the method further includes:

at step S108, before determining the plurality of first data amount ranges based on the at least one first reference data amount, it is determined whether the BSR is to be carried in a message 3 in a random access process; and at step S109, the format for the BSR is set to a second preset format if the BSR is to be carried in the message 3 in the random access process.

Alternatively, the format for the BSR is set based on the amount of the data buffered in the buffer if the BSR is not to be carried in the message 3 in the random access process.

In one or more embodiments, corresponding to the example shown in FIG. 7, the format for the BSR may be set to the second preset format in the case where the BSR is carried through MSG3. In particular, the second preset format may be instructed by the base station or selected by the UE itself. In the second preset format, the number of the bits used to indicate the amount of the data buffered in the buffer may be set as required, for example, the second preset format may be the short format.

Figure 9:
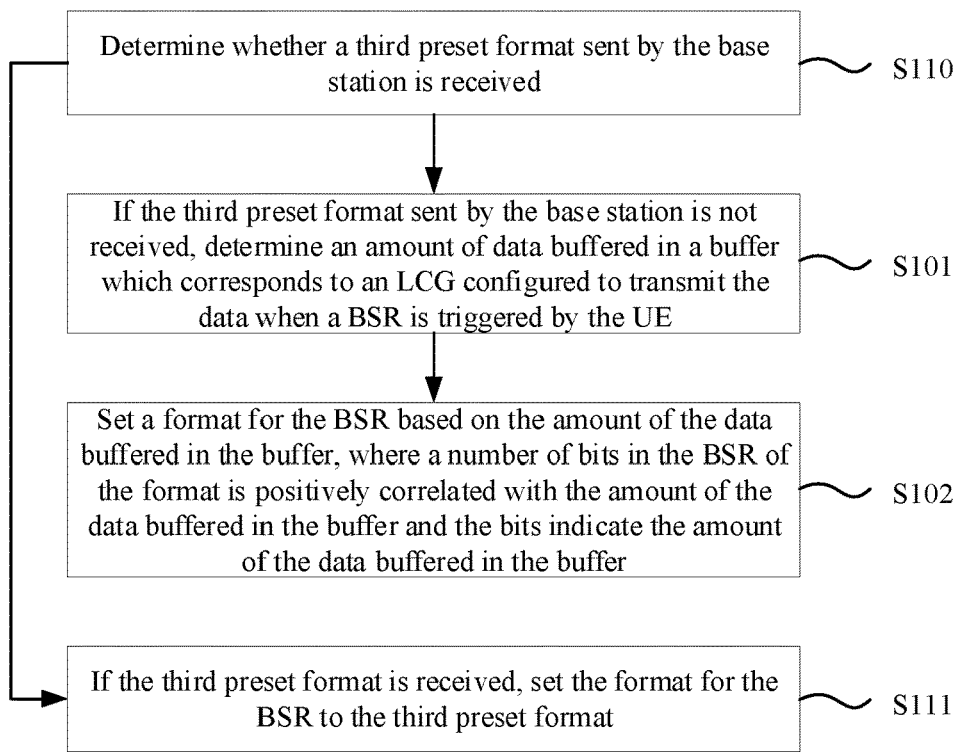
FIG. 9 is a schematic flowchart illustrating another method of setting a BSR format according to an example of the present disclosure.

FIG. 9 is a schematic flowchart illustrating another method of setting a BSR format according to an example of the present disclosure. As shown in FIG. 9, on the basis of the example shown in FIG. 1, the method further includes:

at step S110, before determining the amount of the data buffered in the buffer which corresponds to the LCG configured to transmit the data, it is determined whether a third preset format sent by the base station is received; and at step S111, the format for the BSR is set to the third preset format if the third preset format is received.

In one or more embodiments, the base station may instruct the UE the third preset format, and the UE may determine whether the third preset format sent by the base station is received, and set the format for the BSR to the third preset format if the third preset format is received. In particular, the third preset format may be instructed by the base station or selected by the UE itself. In the third preset format, the number of the bits used to indicate the amount of the data buffered in the buffer may be set as required, for example, the third preset format may be the short format.

Figure 10:
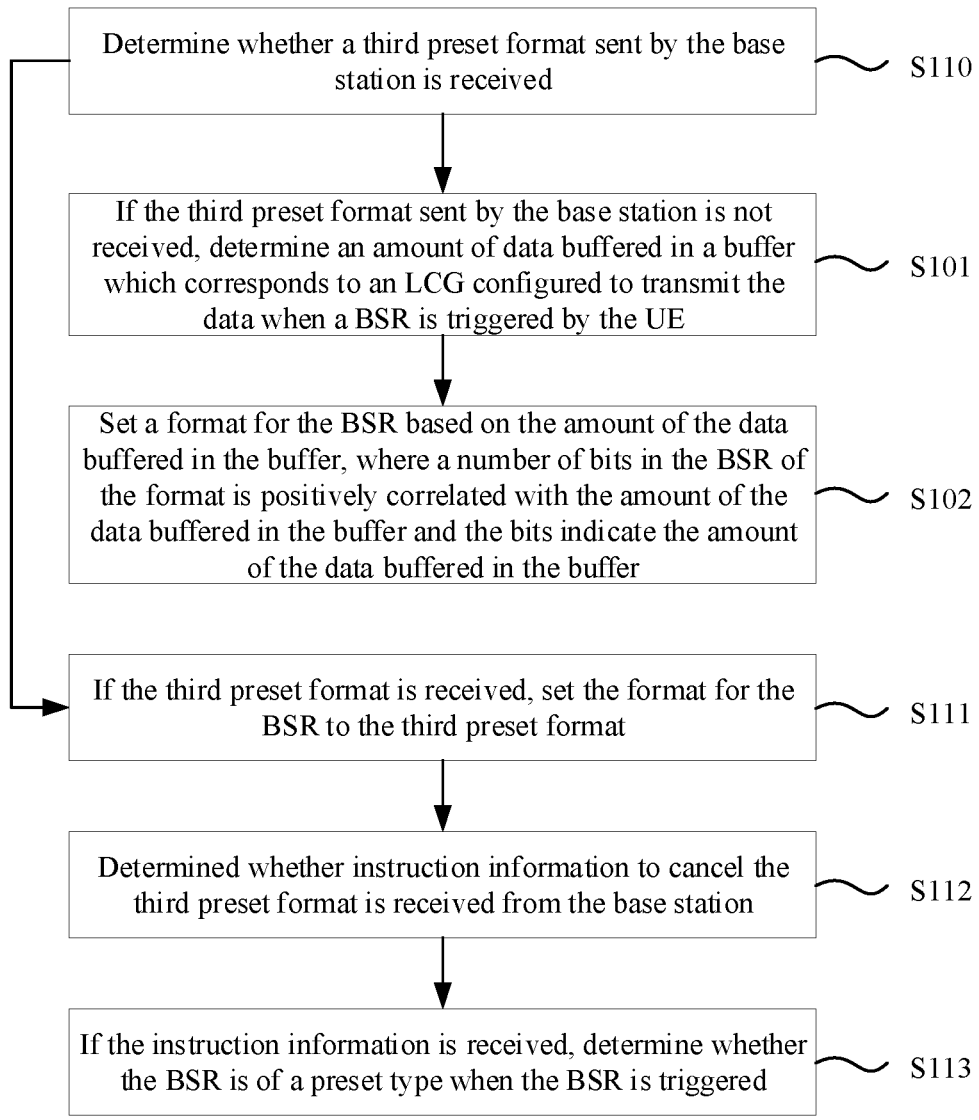
FIG. 10 is a schematic flowchart illustrating another method of setting a BSR format according to an example of the present disclosure.

FIG. 10 is a schematic flowchart illustrating another method of setting a BSR format according to an example of the present disclosure. As shown in FIG. 10, on the basis of the example shown in FIG. 9, the method further includes:

at step S112, after receiving the third preset format, it is determined whether instruction information to cancel the third preset format is received from the base station; and at step S113, if the instruction information is received, it is determined whether the BSR is of a preset type when the BSR is triggered.

In one or more embodiments, after instructing the UE the third preset format, the base station may send the instruction information for canceling the third preset format, so that the UE will set the format for the BSR according to the example shown in FIG. 1 subsequently, instead of setting the BSR to the third preset format.

Figure 11:
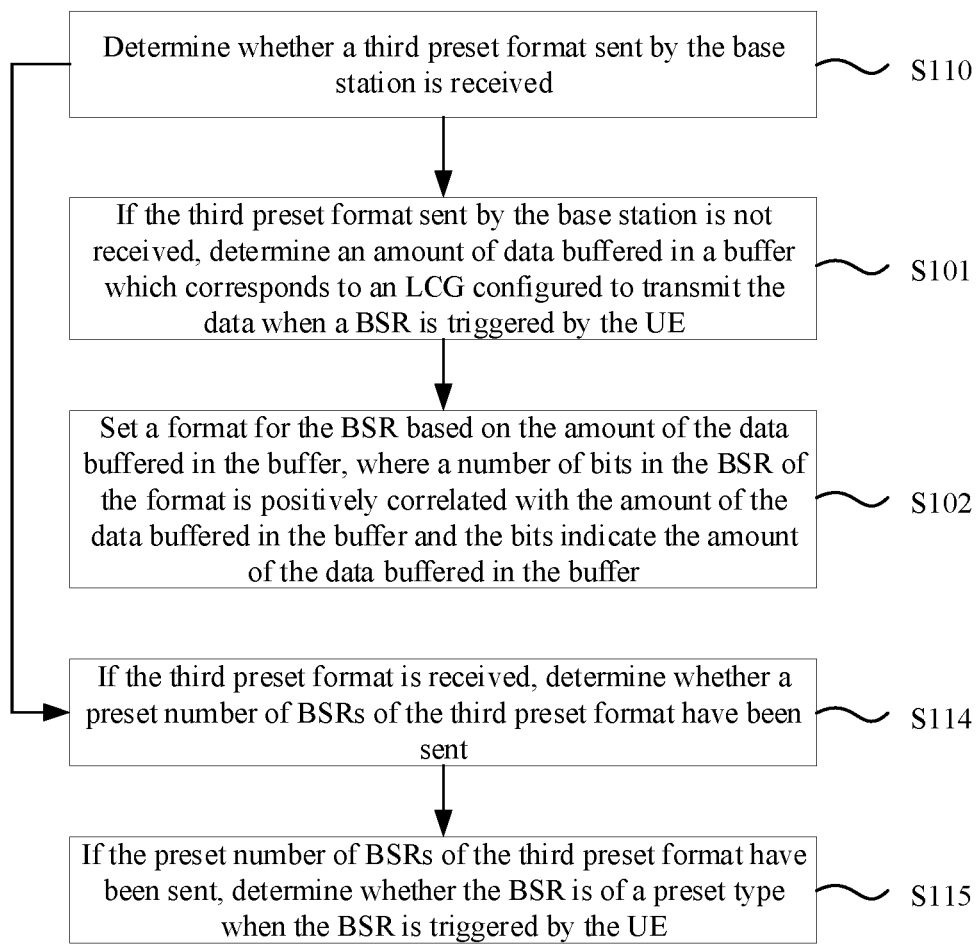
FIG. 11 is a schematic flowchart illustrating another method of setting a BSR format according to an example of the present disclosure.

FIG. 11 is a schematic flowchart illustrating another method of setting a BSR format according to an example of the present disclosure. As shown in FIG. 11, on the basis of the example shown in FIG. 9, the method further includes:

at step S114, after receiving the third preset format, it is determined whether a preset number of BSRs of the third preset format have been sent; and at step S115, if the preset number of BSRs of the third preset format have been sent, it is determined whether the BSR is of a preset type when the BSR is triggered by the UE.

In one or more embodiments, after receiving the third preset format instructed by the base station, the UE may determine whether the number of BSRs of the third preset format that have been sent reaches the preset number. For example, if the preset number is 1, one BSR will be set to the third preset format only once, and be still set based on the example shown in FIG. 1 when being triggered subsequently.

Figure 12:
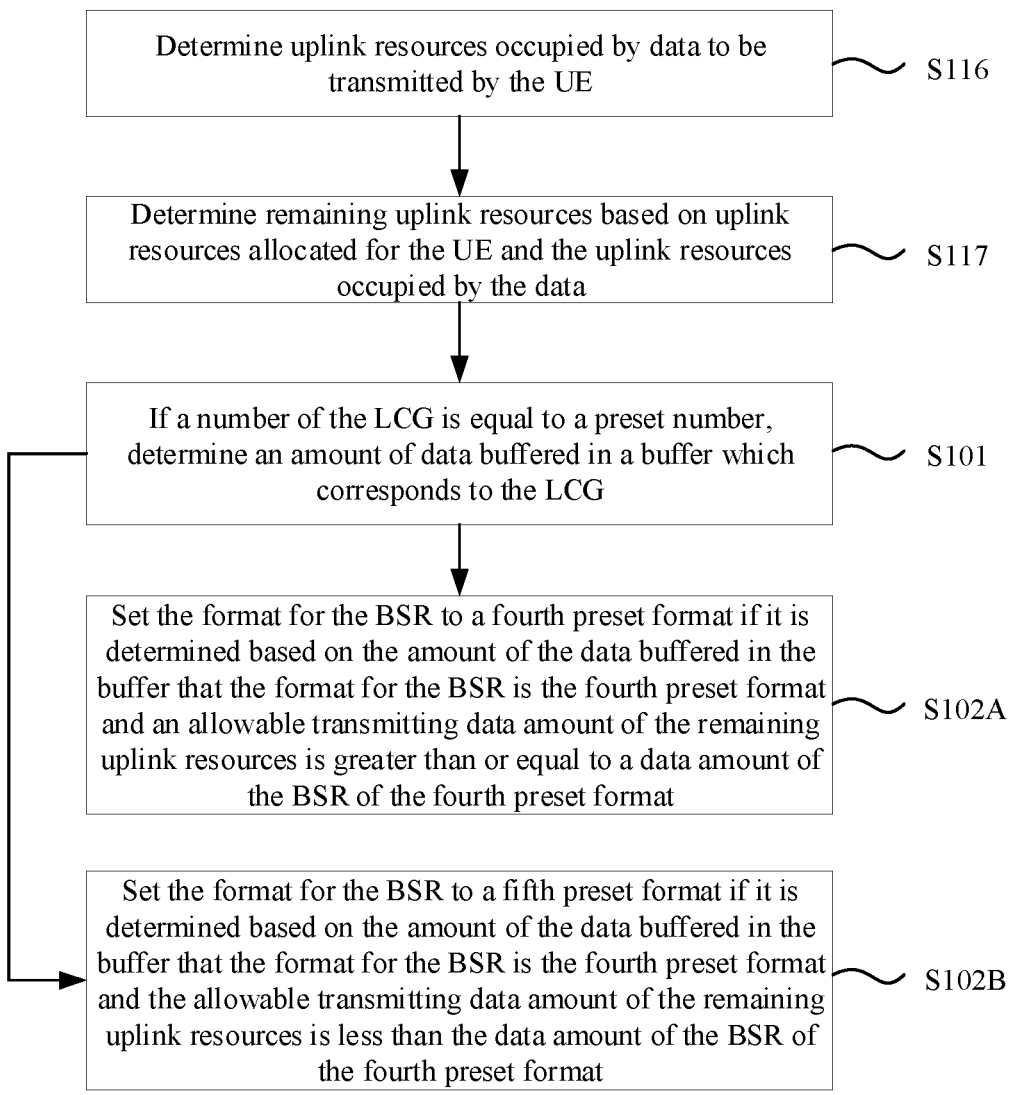
FIG. 12 is a schematic flowchart illustrating another method of setting a BSR format according to an example of the present disclosure.

FIG. 12 is a schematic flowchart illustrating another method of setting a BSR format according to an example of the present disclosure. As shown in FIG. 12, on the basis of the example shown in FIG. 1, the method further includes:

at step S116, before determining the amount of the data buffered in the buffer which corresponds to the LCG configured to transmit the data, uplink resources occupied by data to be transmitted by the UE are determined; and at step S117, remaining uplink resources are determined based on uplink resources allocated for the UE and the uplink resources occupied by the data.

Accordingly, the step that the format for the BSR is set based on the amount of the data buffered in the buffer includes:

at step S102A, the format for the BSR is set to a fourth preset format if it is determined based on the amount of the data buffered in the buffer that the format for the BSR is the fourth preset format and an allowable transmitting data amount of the remaining uplink resources is greater than or equal to a data amount of the BSR of the fourth preset format; and at step S102B, the format for the BSR is set to a fifth preset format if it is determined based on the amount of the data buffered in the buffer that the format for the BSR is the fourth preset format and the allowable transmitting data amount of the remaining uplink resources is less than the data amount of the BSR of the fourth preset format.

In one or more embodiments, a data amount of the BSR of the fifth preset format is less than the data amount of the BSR of the fourth preset format.

In one or more embodiments, the uplink resources allocated by the base station for the UE are mainly for the UE to upload data. If the data to be uploaded does not fully occupy current uplink resources, the remaining uplink resources may be used to send the BSR. However, since the remaining uplink resources are not necessarily enough to send the BSR, it is feasible to determine the relationship between the allowable transmitting data amount of the remaining uplink resources and the data amount of the BSR of the fourth preset format.

When it is determined based on the amount of the data buffered in the buffer that the format for the BSR is the fourth preset format, and the allowable transmitting data amount of the remaining uplink resources is greater than or equal to the data amount of the BSR of the fourth preset format, it means that the remaining uplink resources are enough for the UE to send the BSR of the fourth preset format with greater data amount, i.e., containing more bits used to indicate the amount of the data buffered in the buffer. Therefore, the format for the BSR may be set to the fourth preset format, so that it is guaranteed to avoid allocating too many uplink resources by the base station and causing a waste of uplink resources.

When it is determined based on the amount of the data buffered in the buffer that the format for the BSR is the fourth preset format, and the allowable transmitting data amount of the remaining uplink resources is less than the data amount of the BSR of the fourth preset format, it means that the remaining uplink resources are not enough for the UE to send the BSR of the fourth preset format. Therefore, the format for the BSR may be set to the fifth preset format with less data amount, i.e., containing fewer bits used to indicate the amount of the data buffered in the buffer, so as to ensure that the UE is capable of transmitting data and sending the BSR to the base station through only one transmission.

In particular, the fourth preset format and the fifth preset format may be instructed by the base station or selected by the UE itself. In the fourth preset format and the fifth preset format, the number of the bits used to indicate the amount of the data buffered in the buffer may be set as required. Moreover, it may be guaranteed that the number of the bits used to indicate the amount of the data buffered in the buffer in the BSR of the fourth preset format is larger than the number of the bits used to indicate the amount of the data buffered in the buffer in the BSR of the fifth preset format. For example, the fourth preset format may be the long format while the fifth short.

In an example, the method further includes:

when the BSR is triggered by the UE, it is determined whether the BSR is of a preset type.

In one or more embodiments, the preset type may be a regular type or a periodic type.

In particular, in a case where all logical channels of all the LCGs of the UE have no data available for transmission, the BSR triggered by the UE is of the regular type if any one of the logical channels of the LCGs gets data available for transmission.

In a case where the UE has sent a BSR and is waiting for the base station to send an uplink grant (UL grant), the BSR triggered by the UE is also of the regular type when data with higher priority, i.e., the data whose corresponding logical channel has higher priority than the logical channels of all the above LCGs, is expected to be transmitted.

The base station may configure a timer for the UE through a retxBSR-Timer field in IE: the MAC-MainConfig. The BSR triggered by the UE is also of the regular type when the timer expires and any one logical channel of any one LCG of the UE has data available for transmission.

The time when the data arrives in the buffer of the UE and the time when the UE receive the UL grant may be asynchronous. For example, in a case where the UE requests to upload a file with a great amount of data, the UE will constantly fill data into the buffer corresponding to uplink transmission while both sending the BSR and receiving the UL grant. Therefore, the UE has to constantly update the amount of the data to be uplink transmitted and in this case, the BSR triggered by the UE is of the periodic type.

It should be noted that the preset type is not limited to the Regular or the Periodic described above, and may be configured as required.

If the BSR is of the preset type, it is determined whether a number of the LCG configured to transmit the data is equal to a preset number.

Accordingly, the amount of the data buffered in the buffer which corresponds to the LCG configured to transmit the data is determined in a case where the number of the LCG is equal to the preset number.

In one or more embodiments, for a preset number of LCGs of preset types, the amount of the data buffered in the buffer is generally small in the situation that the UE transmits data of a service with small data packets, which usually requires small overhead. In this case, the overhead can be reduced by adapting the format with fewer bits used to indicate the amount of the data buffered in the buffer. On the contrary, the amount of the data buffered in the buffer is generally great in the situation that the UE transmits data of a service with big data packets, which is rarely affected by the size of the overhead. In this case, therefore, a format with more bits used to indicate the amount of the data buffered in the buffer may be adapted, so as to improve an accuracy of uplink resource allocation by the base station and reduce a waste of uplink resources.

In one or more embodiments, the preset type indicates regular or periodic.

In one or more embodiments, the preset number is 1.

Figure 13:
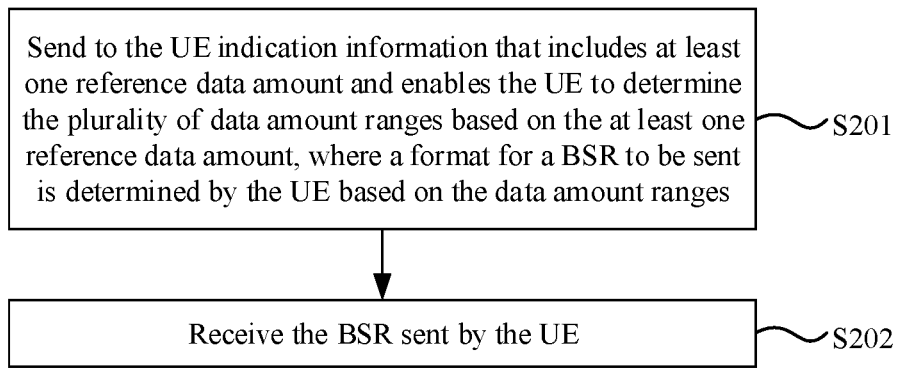
FIG. 13 is a schematic flowchart illustrating a method of sending a reference data amount according to an example of the present disclosure.

FIG. 13 is a schematic flowchart illustrating a method of sending a reference data amount according to an example of the present disclosure. The method of sending a reference data amount according to this example is applicable to a base station, for example, a 4G or 5G base station. The base station may communicate with a UE that is described according to any one of the above examples.

As shown in FIG. 13, the method of sending a reference data amount may include the following steps.

At step S201, indication information is sent to the UE. The indication information includes at least one reference data amount and enables the UE to determine a plurality of data amount ranges based on the at least one reference data amount. A format for a BSR to be sent is determined by the UE based on the data amount ranges.

At step S202, the BSR sent by the UE is received.

In one or more embodiments, the base station may send the indication information to the UE, so as to indicate the at least one reference data amount to the UE. Therefore, the UE may determine the plurality of first data amount ranges based on the at least one reference data amount, and then determine the format for the BSR to be sent based on the first data amount ranges.

It should be noted that the reference data amount in the above embodiments may include the first reference data amount according to the example shown in FIG. 2, and/or the second reference data amount according to the example shown in FIG. 7. In one or more embodiments, the first reference data amount and the second reference data amount may be configured with different labels, so that after receiving one reference data amount, the UE can distinguish the first reference data amount and the second reference data amount based on its label.

Figure 14:
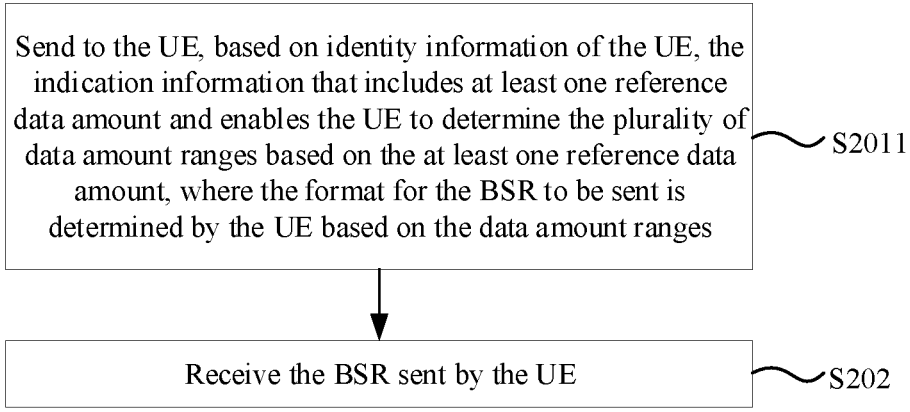
FIG. 14 is a schematic flowchart illustrating another method of sending a reference data amount according to an example of the present disclosure.

FIG. 14 is a schematic flowchart illustrating another method of sending a reference data amount according to an example of the present disclosure. As shown in FIG. 14, on the basis of the example shown in FIG. 13, the step that the indication information is sent to the UE includes:

at step S2011, the indication information is sent to the UE based on identity information of the UE.

In one or more embodiments, the base station may send the indication information to the UE based on the identity information of the UE. For example, for the UEs corresponding to different identity information, the at least one reference data amount in the indication information sent to one UE may be different from that in the indication information sent to the others. In particular, it may be that the number of the at least one reference data amount is different, and/or the value of the reference data amount is different.

Figure 15:
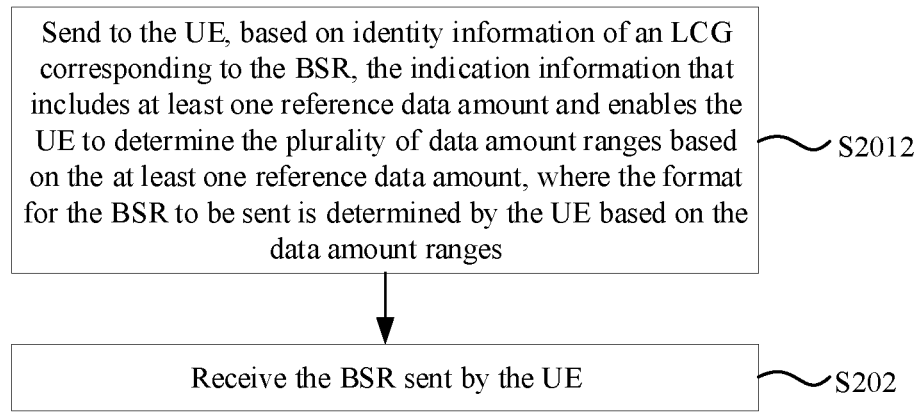
FIG. 15 is a schematic flowchart illustrating another method of sending a reference data amount according to an example of the present disclosure.

FIG. 15 is a schematic flowchart illustrating another method of sending a reference data amount according to an example of the present disclosure. As shown in FIG. 15, on the basis of the example shown in FIG. 13, the step that the indication information is sent to the UE includes:

at step S2012, the indication information is sent to the UE based on identity information of an LCG corresponding to the BSR.

In one or more embodiments, the base station may send the indication information to the UE based on the identity information of the LCG corresponding to the BSR. For example, for the UEs corresponding to the LCGs with different identity information, the at least one reference data amount in the indication information sent to one UE may be different from that in the indication information sent to the others. In particular, it may be that the number of the at least one reference data amount is different, and/or the value of the reference data amount is different.

Figure 16:
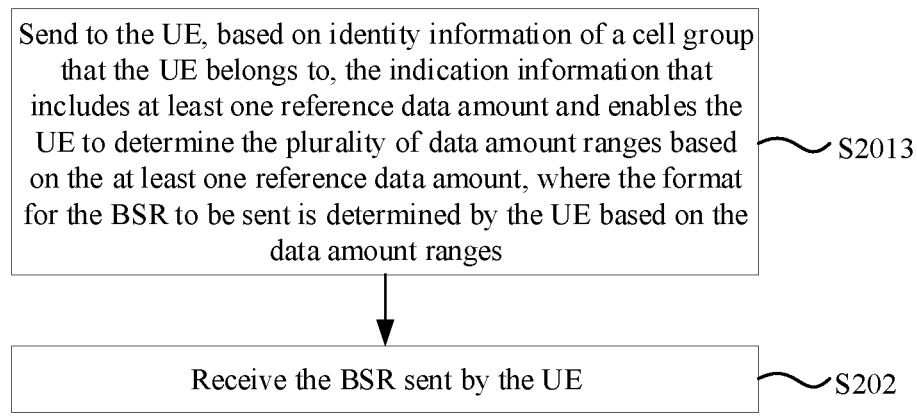
FIG. 16 is a schematic flowchart illustrating another method of sending a reference data amount according to an example of the present disclosure.

FIG. 16 is a schematic flowchart illustrating another method of sending a reference data amount according to an example of the present disclosure. As shown in FIG. 16, on the basis of the example shown in FIG. 13, the step that the indication information is sent to the UE includes:

at step S2013, the indication information is sent to the UE based on identity information of a cell group that the UE belongs to.

In one or more embodiments, the base station may send the indication information to the UE based on the identity information of the cell group that the UE belongs to. For example, for the UEs corresponding to the cells with different identity information, the at least one reference data amount in the indication information sent to one UE may be different from that in the indication information sent to the others. In particular, it may be that the number of the at least one reference data amount is different, and/or the value of the reference data amount is different.

Figure 17:
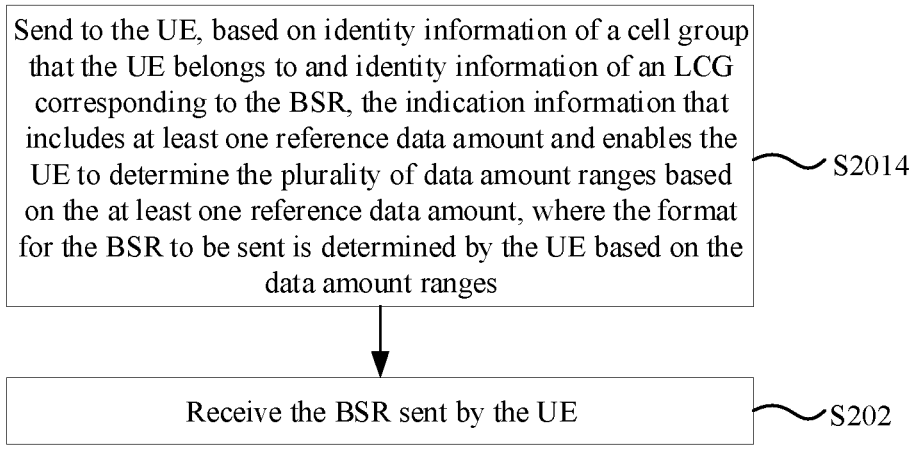
FIG. 17 is a schematic flowchart illustrating another method of sending a reference data amount according to an example of the present disclosure.

FIG. 17 is a schematic flowchart illustrating another method of sending a reference data amount according to an example of the present disclosure. As shown in FIG. 17, on the basis of the example shown in FIG. 13, the step that the indication information is sent to the UE includes:

at step S2014, the indication information is sent to the UE based on identity information of a cell group that the UE belongs to and identity information of an LCG corresponding to the BSR.

In one or more embodiments, the base station may send the indication information to the UE based on the identity information of the cell group that the UE belongs to and the identity information of the LCG corresponding to the BSR. For example, for the UEs corresponding to the LCGs with identical identity information in the cells with different identity information, i.e., the UEs that are in different cells but correspond to the LCGs whose identity information is identical, the at least one reference data amount in the indication information sent to one UE may be different from that in the indication information sent to the others. In particular, it may be that the number of the at least one reference data amount is different, and/or the value of the reference data amount is different.

Corresponding to the foregoing examples of the methods of setting a BSR format and the methods of sending a reference data amount, the present disclosure also provides examples of apparatuses for setting a BSR format and apparatuses for sending a reference data amount.

Figure 18:
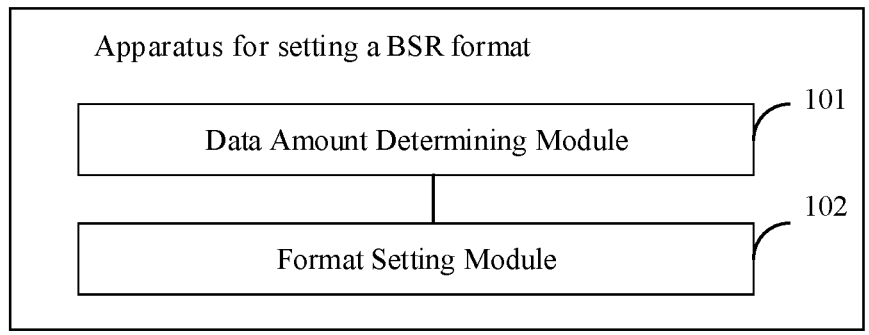
FIG. 18 is a schematic block diagram illustrating an apparatus for setting a BSR format according to an example of the present disclosure.

FIG. 18 is a schematic block diagram illustrating an apparatus for setting a BSR format according to an example of the present disclosure. According to this example, the apparatus for setting a BSR format is applicable to a UE. The UE may be an electronic device such as a mobile and a tablet, and may communicate with a base station.

As shown in FIG. 18, the apparatus for setting a BSR format may include:

a data amount determining module 101 that is configured to when a buffer status report is triggered by the UE, determine an amount of data buffered in a buffer which corresponds to an LCG configured to transmit the data; and a format setting module 102 that is configured to set a format for the BSR based on the amount of the data buffered in the buffer, where a number of bits in the BSR of the format is positively correlated with the amount of the data buffered in the buffer, and the bits indicate the amount of the data buffered in the buffer.

Figure 19:
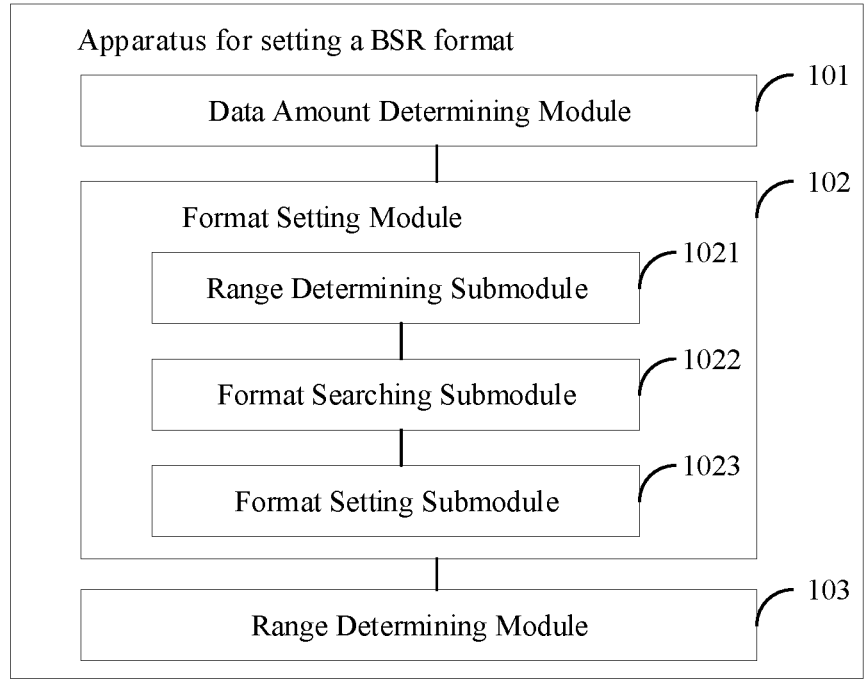
FIG. 19 is a schematic block diagram illustrating another apparatus for setting a BSR format according to an example of the present disclosure.

FIG. 19 is a schematic block diagram illustrating another apparatus for setting a BSR format according to an example of the present disclosure. As shown in FIG. 19, on the basis of the example shown in FIG. 18, the apparatus further includes:

a range determining module 103 that is configured to determine a plurality of first data amount ranges based on at least one first reference data amount, where the plurality of first data amount ranges respectively correspond to different first formats.

Accordingly, the format setting module 102 includes:

a range determining submodule 1021 that is configured to determine a target first data amount range, where the amount of the data buffered in the buffer locates in the target first data amount range;

a format searching submodule 1022 that is configured to search for a target first format corresponding to the target first data amount range; and a format setting submodule 1023 that is configured to set the format for the BSR to the target first format.

In one or more embodiments, the at least one first reference data amount includes one first reference data amount, and the range determining submodule 1021 is configured to determine a relationship between the amount of the data buffered in the buffer and the first reference data amount; and the format setting submodule 1023 is configured to set the format for the BSR to a short format in a case where the amount of the data buffered in the buffer is less than or equal to the first reference data amount, and set the format for the buffer status report to a long format in a case where the amount of the data buffered in the buffer is greater than the first reference data amount.

Figure 20:
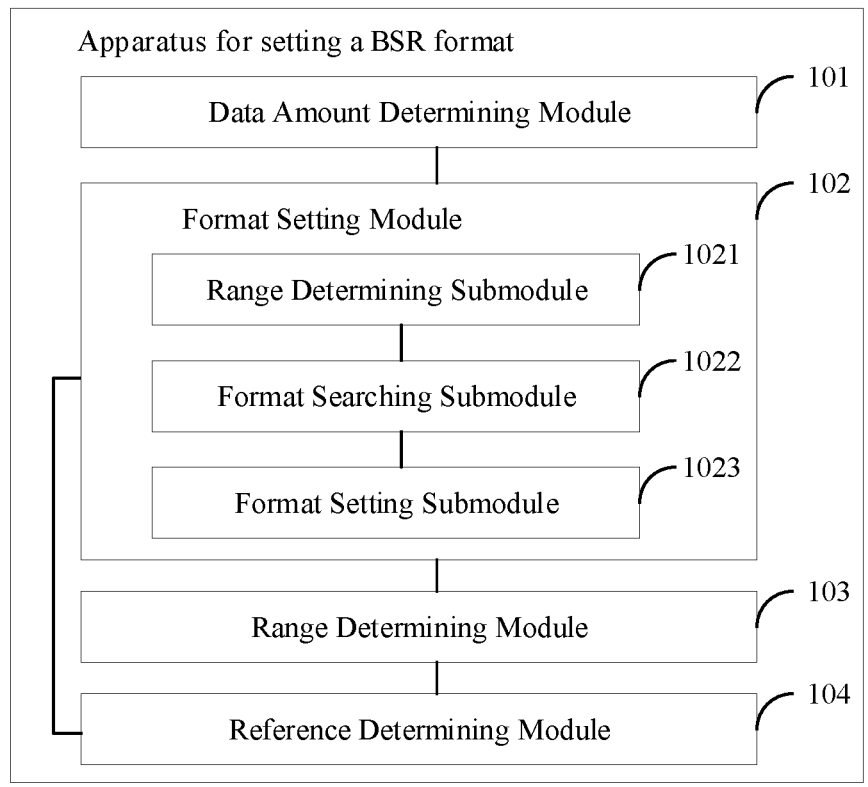
FIG. 20 is a schematic block diagram illustrating another apparatus for setting a BSR format according to an example of the present disclosure.

FIG. 20 is a schematic block diagram illustrating another apparatus for setting a BSR format according to an example of the present disclosure. As shown in FIG. 20, on the basis of the example shown in FIG. 19, the apparatus further includes:

a reference determining module 104 that is configured to determine the first reference data amount by receiving information broadcast by the base station, or determine the first reference data amount by receiving a dedicated signaling sent by the base station, or selecting a pre-stored negotiated value as the first reference data amount.

In one or more embodiments, the reference determining module 104 is configured to select the pre-stored negotiated value as the first reference data amount in a case where the first reference data amount is not determined based on the information broadcast by the base station, the first reference data amount is not determined based on a control signaling sent by the base station, and/or the first reference data amount is not determined based on control data sent by the base station.

In one or more embodiments, the format setting module 102 is configured to set the format for the BSR to a first preset format in a case where the first reference data amount is not determined based on the information broadcast by the base station, the first reference data amount is not determined based on the control signaling sent by the base station, and/or the first reference data amount is not determined based on the control data sent by the base station.

Figure 21:
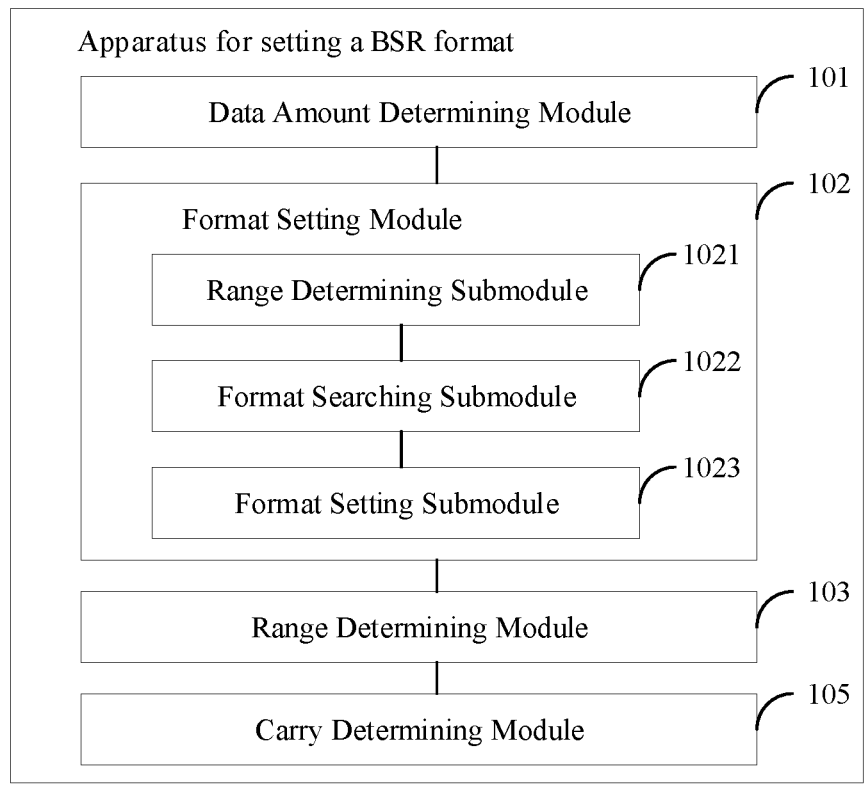
FIG. 21 is a schematic block diagram illustrating another apparatus for setting a BSR format according to an example of the present disclosure.

FIG. 21 is a schematic block diagram illustrating another apparatus for setting a BSR format according to an example of the present disclosure. As shown in FIG. 21, on the basis of the example shown in FIG. 19, the apparatus further includes:

a carry determining module 105 that is configured to before determining the plurality of first data amount ranges based on the at least one first reference data amount, determine whether the BSR is to be carried in a message 3 in a random access process.

Accordingly, the range determining module 103 is configured to determine a plurality of second data amount ranges based on at least one second reference data amount in a case where the BSR is to be carried in the message 3 in the random access process. In one or more embodiments, the plurality of second data amount ranges respectively correspond to different second formats.

In addition, the range determining submodule 1021 is configured to determine a target second data amount range, where the amount of the data buffered in the buffer locates in the target second data amount range; the format searching submodule 1022 is configured to search for a target second format corresponding to the target second data amount range; and the format setting submodule 1023 is configured to set the format for the BSR to the target second format.

In one or more embodiments, the carry determining module 105 is configured to before determining the plurality of first data amount ranges based on the at least one first reference data amount, determine whether the BSR is to be carried in a message 3 in a random access process.

Accordingly, the format setting module 102 is configured to set the format for the BSR to a second preset format in a case where the BSR is to be carried in the message 3 in the random access process, and set the format for the BSR based on the amount of the data buffered in the buffer in a case where the BSR is not to be carried in the message 3 in the random access process.

Figure 22:
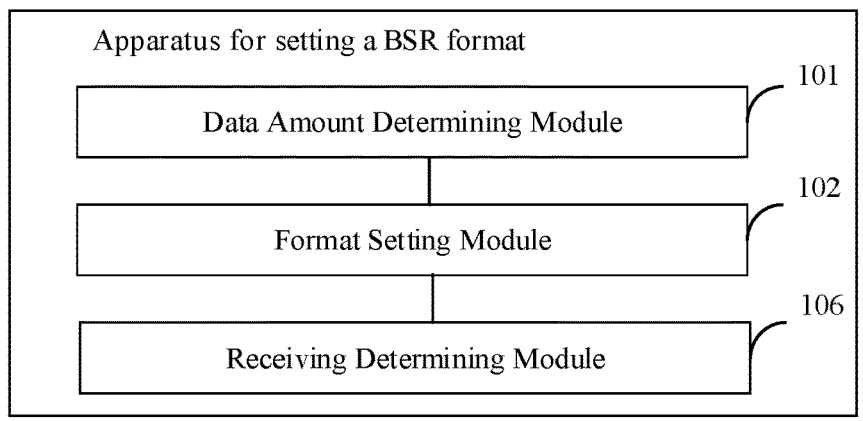
FIG. 22 is a schematic block diagram illustrating another apparatus for setting a BSR format according to an example of the present disclosure.

FIG. 22 is a schematic block diagram illustrating another apparatus for setting a BSR format according to an example of the present disclosure. As shown in FIG. 22, on the basis of the example shown in FIG. 18, the apparatus further includes:

a receiving determining module 106 that is configured to determine whether a third preset format sent by the base station is received;

Accordingly, the format setting module 102 is configured to set the format for the BSR to the third preset format in a case where the third preset format is received.

Figure 23:
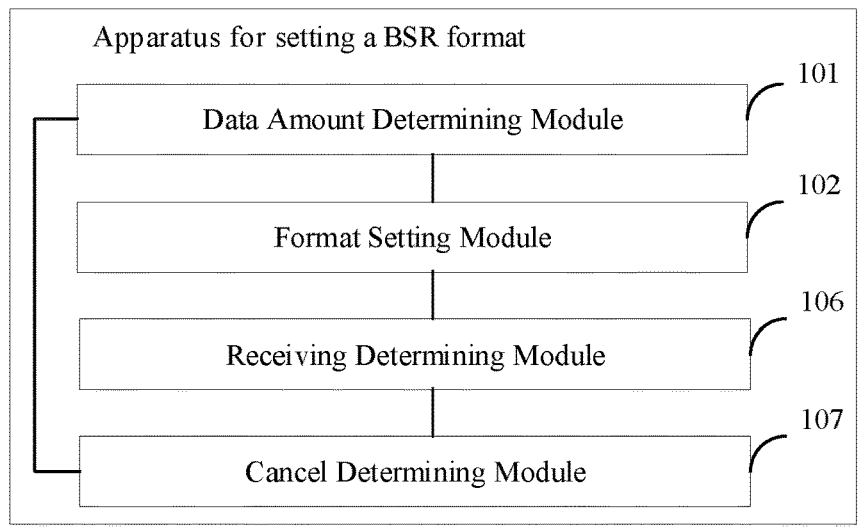
FIG. 23 is a schematic block diagram illustrating another apparatus for setting a BSR format according to an example of the present disclosure.

FIG. 23 is a schematic block diagram illustrating another apparatus for setting a BSR format according to an example of the present disclosure. As shown in FIG. 23, on the basis of the example shown in FIG. 22, the apparatus further includes:

a cancel determining module 107 that is configured to after the third preset format is received, determine whether instruction information to cancel the third preset format is received from the base station; and a type determining module that is configured to determine whether the BSR is of a preset type in a case where the instruction information is received.

Figure 24:
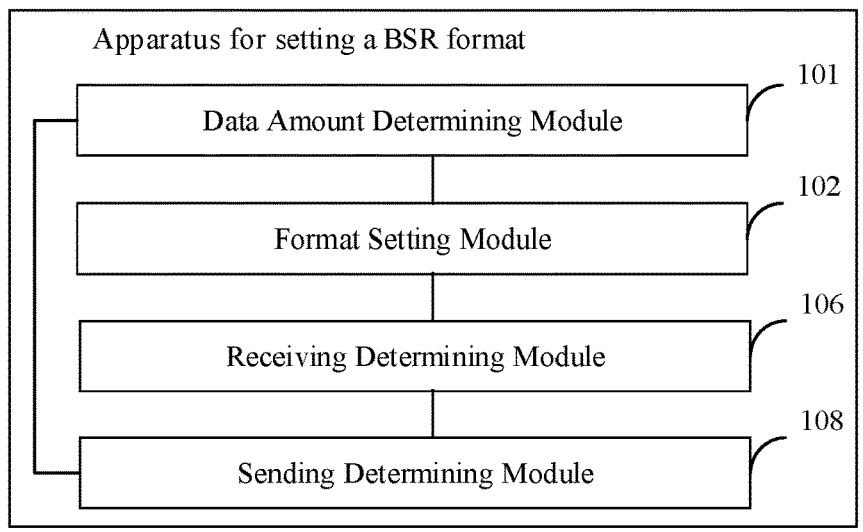
FIG. 24 is a schematic block diagram illustrating another apparatus for setting a BSR format according to an example of the present disclosure.

FIG. 24 is a schematic block diagram illustrating another apparatus for setting a BSR format according to an example of the present disclosure. As shown in FIG. 24, on the basis of the example shown in FIG. 22, the apparatus further includes:

a sending determining module 108 that is configured to after the third preset format is received, determine whether a preset number of BSRs of the third preset format have been sent; and a type determining module that is configured to in a case where the preset number of BSRs of the third preset format have been sent, determine, when the BSR is triggered by the UE, whether the BSR is of a preset type.

Figure 25:
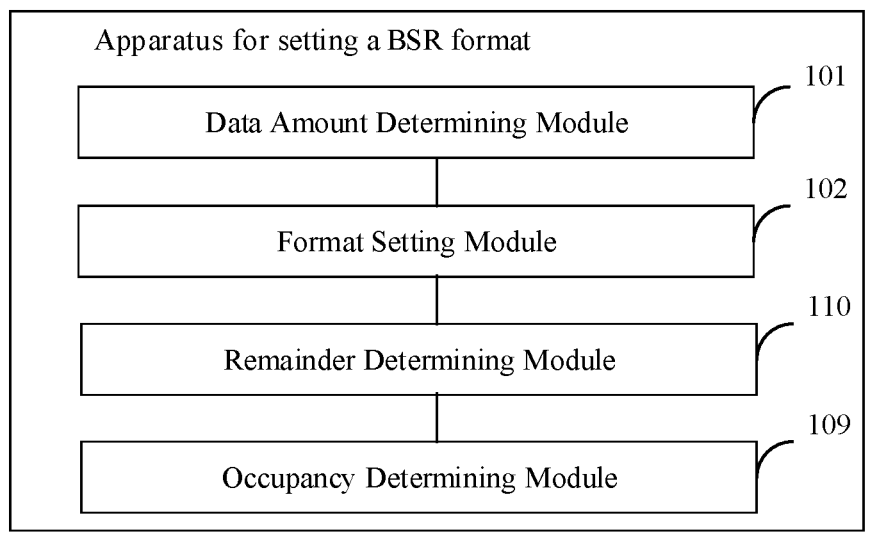
FIG. 25 is a schematic block diagram illustrating another apparatus for setting a BSR format according to an example of the present disclosure.

FIG. 25 is a schematic block diagram illustrating another apparatus for setting a BSR format according to an example of the present disclosure. As shown in FIG. 25, on the basis of the example shown in FIG. 18, the apparatus further includes:

an occupancy determining module 109 that is configured to determine uplink resources occupied by data to be transmitted by the UE; and a remainder determining module 110 that is configured to determine remaining uplink resources based on uplink resources allocated for the UE and the uplink resources occupied by the data.

Accordingly, the format setting module 102 is configured to set the format for the BSR to a fourth preset format in a case where it is determined based on the amount of the data buffered in the buffer that the format for the BSR is the fourth preset format and an allowable transmitting data amount of the remaining uplink resources is greater than or equal to a data amount of the BSR of the fourth preset format, and set the format for the BSR to a fifth preset format in a case where it is determined based on the amount of the data buffered in the buffer that the format for the BSR is the fourth preset format and the allowable transmitting data amount of the remaining uplink resources is less than the data amount of the BSR of the fourth preset format. In one or more embodiments, a data amount of the BSR of the fifth preset format is less than the data amount of the BSR of the fourth preset format.

In an example, the apparatus further includes:

a type determining module that is configured to when the BSR is triggered by the UE, determine whether the BSR is of a preset type; and a number determining module that is configured to in a case where the BSR is of the preset type, determine whether a number of the LCG configured to transmit the data is equal to a preset number.

Accordingly, the data amount determining module 101 is configured to in a case where the number of the LCG is equal to the preset number, determine the amount of the data buffered in the buffer which corresponds to the LCG configured to transmit the data.

In one or more embodiments, the preset type indicates regular or periodic.

In one or more embodiments, the preset number is 1.

Figure 26:
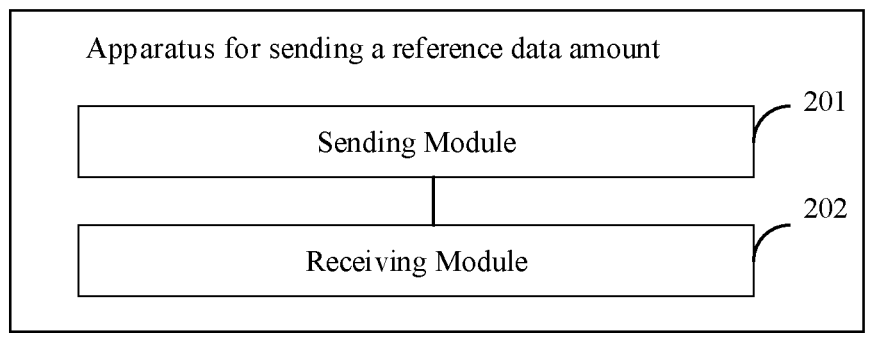
FIG. 26 is a schematic block diagram illustrating an apparatus for sending a reference data amount according to an example of the present disclosure.

FIG. 26 is a schematic block diagram illustrating an apparatus for sending a reference data amount according to an example of the present disclosure. The apparatus for sending a reference data amount according to this example is applicable to a base station, for example, a 4G or 5G base station. The base station may communicate with a UE that is described according to any one of the above examples.

As shown in FIG. 26, the apparatus for sending a reference data amount includes:

a sending module 201 that is configured to send, to a UE, indication information that includes at least one reference data amount and enables the UE to determine a plurality of data amount ranges based on the at least one reference data amount, where the UE is to determine a format for a BSR to be sent based on the data amount ranges; and a receiving module 202 that is configured to receive the BSR sent by the UE.

In one or more embodiments, the sending module 201 is configured to send the indication information to the UE based on identity information of the UE.

In one or more embodiments, the sending module 201 is configured to send the indication information to the UE based on identity information of an LCG corresponding to the BSR.

In one or more embodiments, the sending module 201 is configured to send the indication information to the UE based on identity information of a cell group that the UE belongs to.

In one or more embodiments, the sending module 201 is configured to send the indication information to the UE based on identity information of a cell group that the UE belongs to and identity information of an LCG corresponding to the BSR.

Regarding the apparatus in the foregoing examples, the specific manner in which each module performs its operations has been described in detail in the examples of the related method, and will not be repeated here.

Since the apparatus examples essentially correspond to the method examples, reference may be made to the description of related parts of the method examples. The apparatus examples described above are merely illustrative, where the units described as separate members may be or not be physically separated, and the members displayed as units may be or not be physical units, i.e., may be located in one place, or may be distributed to a plurality of network units. Some or all of the modules may be selected according to actual needs to achieve the objectives of the implementations of the examples. It can be understood and implemented by those of ordinary skill in the art without any creative effort.

An example of the present disclosure also provides an electronic device, including:

a processor; and a memory for storing instructions executable by the processor.

The processor is configured to perform the steps of the method of setting a BSR format described in any one of the above examples.

An example of the present disclosure also provides an electronic device, including:

a processor; and a memory for storing instructions executable by the processor.

The processor is configured to perform the steps of the method of sending a reference data amount described in any one of the above examples.

An example of the present disclosure also provides a computer-readable storage medium having a computer program stored thereon. The program implements, when executed by a processor, the steps of the method of setting a BSR format described in any one of the above examples.

An example of the present disclosure also provides a computer-readable storage medium having a computer program stored thereon. The program implements, when executed by a processor, the steps of the method of sending a reference data amount described in any one of the above examples.

Figure 27:
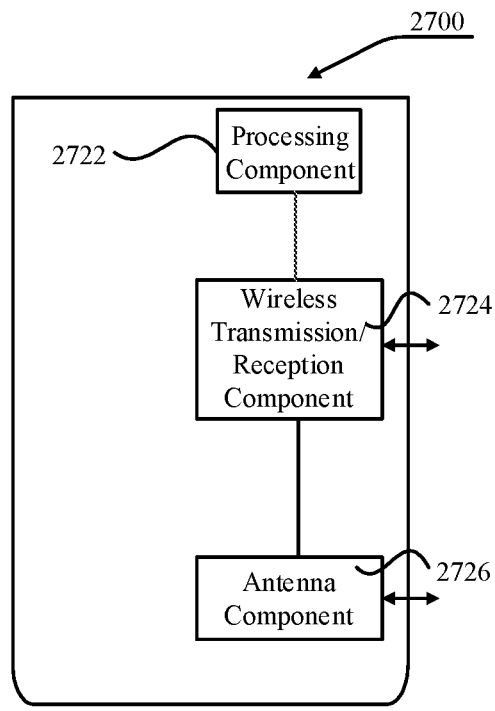
FIG. 27 is a schematic block diagram illustrating a device for sending a reference data amount according to an example of the present disclosure.

FIG. 27 is a schematic block diagram illustrating a device 2700 for sending a reference data amount according to an example of the present disclosure. The device 2700 may be provided as a base station. As shown in FIG. 27, the device 2700 includes a processing component 2722, a wireless transmission/reception component 2724, an antenna component 2726, and a signal processing part peculiar to the wireless interface. The processing component 2722 may further include one or more processors. One processor of the processing component 2722 may be configured to perform the steps of the method of sending a reference data amount described in any one of the above examples.

Figure 28:
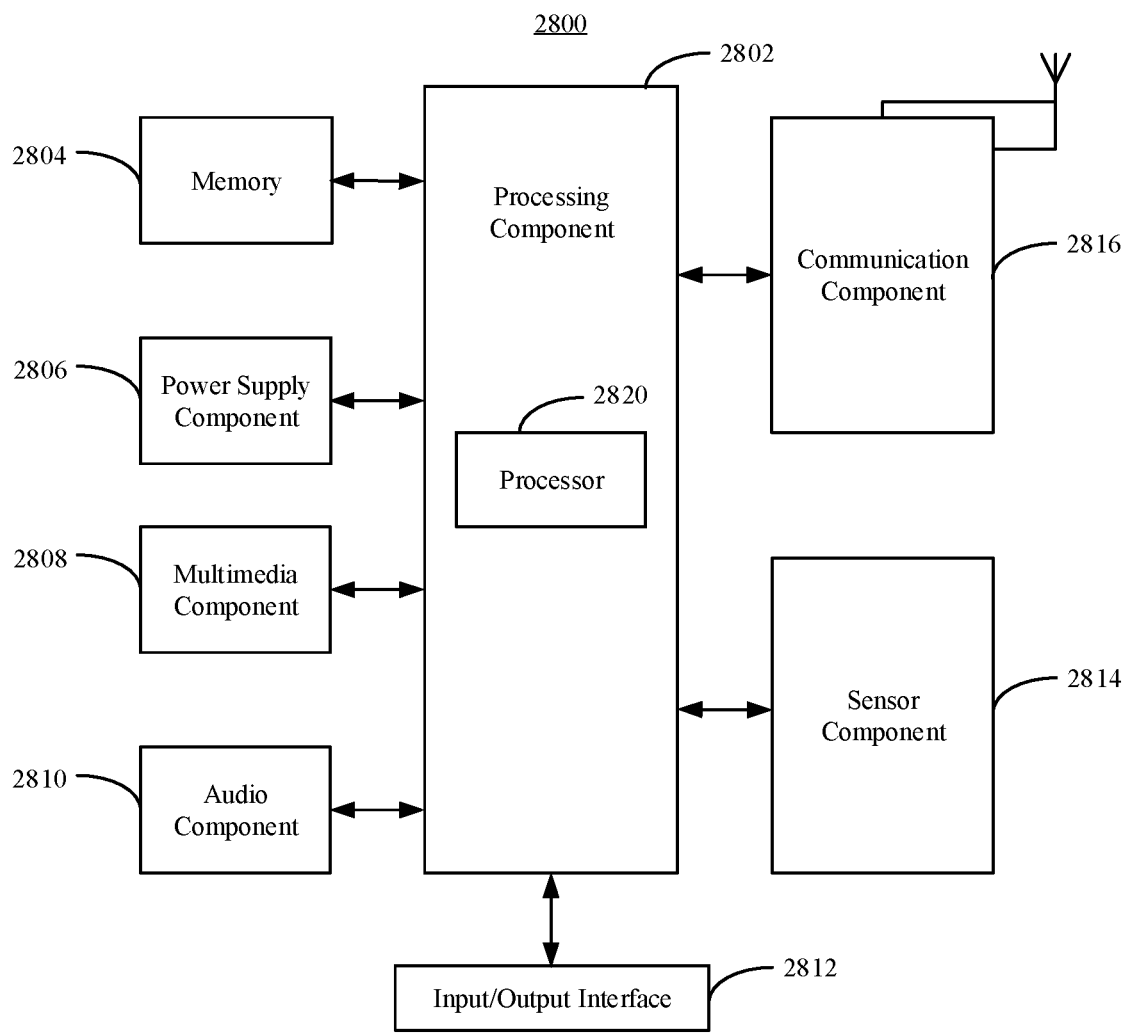
FIG. 28 is a schematic block diagram illustrating a device for setting a BSR format according to an example of the present disclosure.

FIG. 28 is a schematic block diagram illustrating a device 2800 for setting a BSR format according to an example of the present disclosure. For example, the device 2800 may be a mobile phone, a computer, a digital broadcasting terminal, a messaging device, a game console, a tablet device, a medical device, a fitness device, a personal digital assistant, and the like.

As shown in FIG. 28, the device 2800 may include one or more of the following components: a processing component 2802, a memory 2804, a power supply component 2806, a multimedia component 2808, an audio component 2810, an input/output (I/O) interface 2812, a sensor component 2814, and a communication component 2816.

The processing component 2802 generally controls overall operations of the device 2800, such as operations associated with display, phone calls, data communications, camera operations, and recording operations. The processing element 2802 may include one or more processors 2820 to execute instructions to complete all or part of the steps of the above methods. In addition, the processing component 2802 may include one or more modules which facilitate the interaction between the processing component 2802 and other components. For example, the processing component 2802 may include a multimedia module to facilitate the interaction between the multimedia component 2808 and the processing component 2802.

The memory 2804 is configured to store various types of data to support the operation of the device 2800. Embodiments of such data include instructions for any application or method operating on the device 2800, contact data, phone book data, messages, pictures, videos, and the like. The memory 2804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2806 supplies power for different components of the device 2800. The power supply component 2806 may include a power supply management system, one or more power supplies, and other components associated with generating, managing and distributing power for the device 2800.

The multimedia component 2808 includes a screen providing an output interface between the device 2800 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some embodiments, the multimedia component 2808 may include a front camera and/or a rear camera. The front camera and/or rear camera may receive external multimedia data when the device 2800 is in an operating mode, such as a photographing mode or a video mode. Each front camera and rear camera may be a fixed optical lens system or have focal length and optical zooming capability.

The audio component 2810 is configured to output and/or input an audio signal. For example, the audio component 2810 includes a microphone (MIC). When the device 2800 is in an operating mode, such as a call mode, a record mode and a voice recognition mode, the microphone is configured to receive an external audio signal. The received audio signal may be further stored in the memory 2804 or sent via the communication component 2816. In some embodiments, the audio component 2810 further includes a speaker for outputting an audio signal.

The I/O interface 2812 provides an interface between the processing component 2802 and a peripheral interface module. The above peripheral interface module may be a keyboard, a click wheel, buttons, or the like. These buttons may include but not limited to, a home button, a volume button, a start button and a lock button.

The sensor component 2814 includes one or more sensors to provide status assessments of various aspects for the device 2800. For example, the sensor component 2814 may detect an open/closed state of the device 2800 and a relative positioning of components such as the display and keypad of the device 2800, and the sensor component 2814 can also detect a change in position of the device 2800 or a component of the device 2800, the presence or absence of user contact with the device 2800, orientation or acceleration/deceleration of the device 2800, and temperature change of the device 2800. The sensor component 2814 may include a proximity sensor configured to detect the presence of nearby objects without any physical contact. The sensor component 2814 may also include a light sensor, such as a Complementary Metal-Oxide-Semiconductor (CMOS) or Charged Coupled Device (CCD) image sensor, for use in imaging applications. In some embodiments, the sensor component 2814 may further include an acceleration sensor, a gyroscope sensor, a magnetic sensor, a pressure sensor, or a temperature sensor.

The communication component 2816 is configured to facilitate wired or wireless communication between the device 2800 and other devices. The device 2800 may access a wireless network based on a communication standard, such as Wi-Fi, 2G or 3G, or a combination thereof. In one or more embodiments, the communication component 2816 receives broadcast signals or broadcast related information from an external broadcast management system via a broadcast channel. In one or more embodiments, the communication component 2816 also includes a near field communication (NFC) module to facilitate short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In one or more embodiments, the device 2800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, so as to perform the method of setting a BSR format described in any one of the above examples.

In one or more embodiments, there is also provided a non-transitory computer-readable storage medium including instructions, such as the memory 2804 including instructions executable by the processor 2820 of the device 2800 to implement the above methods. For example, the non-transitory computer-readable storage medium may be a ROM, a random access memory (RAM), a CD-ROM, a magnetic tape, a floppy disk, and an optical data storage device.

Other implementations of the present disclosure will be readily apparent to those skilled in the art after implementing the disclosure by referring to the specification. The present application is intended to cover any variations, uses, or adaptations of the present disclosure which are in accordance with the general principles of the present disclosure and include common knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures shown in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device including the element.

The method and device provided by the examples of the present disclosure are described in detail above. Specific examples are used in this disclosure to illustrate the principle and the implementations of the present disclosure. The description of the above examples is only used to help understand the methods and its core idea of the present disclosure. Moreover, those skilled in the art can change both the specific implementations and the application scope according to the idea of the present disclosure. In summary, the content of this specification should not be construed as a limitation to the present disclosure.

What is claimed is:

1. A method of setting a buffer status report format, comprising:
   triggering, by a user equipment, a buffer status report;
   in response to triggering the buffer status report, determining, by the user equipment, an amount of data buffered in a buffer corresponding to a logical channel group configured to transmit the data; and
   determining, by the user equipment, a plurality of first data amount ranges based on at least one first reference data amount, wherein the plurality of first data amount ranges respectively correspond to different first formats;
   determining, by the user equipment, a target first data amount range, wherein the amount of the data buffered in the buffer locates in the target first data amount range;
   searching, by the user equipment, for a target first format corresponding to the target first data amount range; and
   setting, by the user equipment, a format for the buffer status report to the target first format;
   wherein a number of bits in the buffer status report of the format is positively correlated with the amount of the data buffered in the buffer, and the bits indicate the amount of the data buffered in the buffer.

2. The method according to claim 1, wherein the at least one first reference data amount comprises one first reference data amount, and the method further comprises:
   determining, by the user equipment, a relationship between the amount of the data buffered in the buffer and the first reference data amount;
   in response to determining that the amount of the data buffered in the buffer is less than or equal to the first reference data amount, setting, by the user equipment, the format for the buffer status report to a short format; and
   in response to determining that the amount of the data buffered in the buffer is greater than the first reference data amount, setting, by the user equipment, the format for the buffer status report to a long format.

3. The method according to claim 1, before determining, by the user equipment, the plurality of first data amount ranges based on the at least one first reference data amount, further comprising one of followings:
   determining, by the user equipment, the at least one first reference data amount by receiving information broadcast by a base station,
   determining, by the user equipment, the at least one first reference data amount by receiving a dedicated signaling sent by the base station, or selecting, by the user equipment, a pre-stored negotiated value as one of the at least one first reference data amount.

4. The method according to claim 3, further comprising:
selecting, by the user equipment, the pre-stored negotiated value as one of the at least one first reference data amount in response to determining that the at least one first reference data amount is not determined based on at least one of followings:
the information broadcast by the base station,
a control signaling sent by the base station, or
control data sent by the base station.

5. The method according to claim 3, further comprising:
setting, by the user equipment, the format for the buffer status report to a first preset format in response to determining that the at least one first reference data amount is not determined based on at least one of followings:
the information broadcast by the base station,
a control signaling sent by the base station, or
control data sent by the base station.

6. The method according to claim 1, further comprising:
before determining the plurality of first data amount ranges based on the at least one first reference data amount, determining, by the user equipment, whether the buffer status report is to be carried in a message 3 in a random access process; and
in response to determining that the buffer status report is to be carried in the message 3 in the random access process, determining, by the user equipment, a plurality of second data amount ranges based on at least one second reference data amount, wherein the plurality of second data amount ranges respectively correspond to different second formats;
wherein the method further comprises:
determining, by the user equipment, a target second data amount range, wherein the amount of the data buffered in the buffer locates in the target second data amount range;
searching, by the user equipment, for a target second format corresponding to the target second data amount range; and
setting, by the user equipment, the format for the buffer status report to the target second format.

7. The method according to claim 1, further comprising:
before determining the plurality of first data amount ranges based on the at least one first reference data amount, determining, by the user equipment, whether the buffer status report is to be carried in a message 3 in a random access process;
in response to determining that the buffer status report is to be carried in the message 3 in the random access process, setting, by the user equipment, the format for the buffer status report to a second preset format; and
in response to determining that the buffer status report is not to be carried in the message 3 in the random access process, setting, by the user equipment, the format for the buffer status report based on the amount of the data buffered in the buffer.

8. The method according to claim 1, further comprising:
before determining the amount of the data buffered in the buffer corresponding to the logical channel group configured to transmit the data, determining, by the user equipment, whether a third preset format sent by a base station is received; and
in response to determining that the third preset format is received, setting, by the user equipment, the format for the buffer status report to the third preset format.

9. The method according to claim 8, further comprising:
after receiving the third preset format, determining, by the user equipment, whether instruction information to cancel the third preset format is received from the base station; and
in response to determining that the instruction information is received and in response to triggering the buffer status report, determining, by the user equipment, whether the buffer status report is of a preset type.

10. The method according to claim 8, further comprising:
after receiving the third preset format, determining, by the user equipment, whether a preset number of buffer status reports of the third preset format have been sent; and
in response to determining that the preset number of buffer status reports of the third preset format have been sent and in response to triggering the buffer status report by the user equipment, determining, by the user equipment, whether the buffer status report is of a preset type.

11. The method according to claim 1, further comprising:
before determining the amount of the data buffered in the buffer corresponding to the logical channel group configured to transmit the data, determining, by the user equipment, uplink resources occupied by data to be transmitted by the user equipment; and
determining, by the user equipment, remaining uplink resources based on uplink resources allocated for the user equipment and the uplink resources occupied by the data;
wherein the method further comprises:
setting, by the user equipment, the format for the buffer status report to a fourth preset format in response to determining based on the amount of the data buffered in the buffer that the format for the buffer status report is the fourth preset format and an allowable transmitting data amount of the remaining uplink resources is greater than or equal to a data amount of the buffer status report of the fourth preset format; and
setting, by the user equipment, the format for the buffer status report to a fifth preset format in response to determining based on the amount of the data buffered in the buffer that the format for the buffer status report is the fourth preset format and the allowable transmitting data amount of the remaining uplink resources is less than the data amount of the buffer status report of the fourth preset format;
wherein a data amount of the buffer status report of the fifth preset format is less than the data amount of the buffer status report of the fourth preset format.

12. The method according to claim 1, before determining, by the user equipment, the amount of the data buffered in the buffer corresponding to the logical channel group configured to transmit the data, further comprising:
in response to triggering the buffer status report by the user equipment, determining, by the user equipment, whether the buffer status report is of a preset type;
in response to determining that the buffer status report is of the preset type, determining, by the user equipment, whether a number of the logical channel group configured to transmit the data is equal to a preset number; and in response to determining that the number of the logical channel group is equal to the preset number, determining, by the user equipment, the amount of the data buffered in the buffer corresponding to the logical channel group configured to transmit the data.

13. The method according to claim 12, wherein the preset type indicates regular or periodic.

14. The method according to claim 12, wherein the preset number is 1.

15. A method of sending a reference data amount, comprising:
sending, by a base station, indication information to a user equipment, wherein the indication information comprises at least one reference data amount and enables the user equipment to determine a plurality of data amount ranges respectively corresponding to different formats based on the at least one reference data amount, wherein a target format for a buffer status report to be sent is determined by the user equipment through determining a target data amount range in which an amount of data buffered in a buffer locates and searching for the target format corresponding to the target data amount range; and
receiving, by the base station, the buffer status report sent by the user equipment.

16. The method according to claim 15, wherein sending, by the base station, the indication information to the user equipment comprises one of followings:
sending, by the base station, the indication information to the user equipment based on identity information of the user equipment;
sending, by the base station, the indication information to the user equipment based on identity information of a logical channel group corresponding to the buffer status report; or
sending, by the base station, the indication information to the user equipment based on identity information of a cell group that the user equipment belongs to.

17. The method according to claim 15, wherein sending, by the base station, the indication information to the user equipment comprises:
sending, by the base station, the indication information to the user equipment based on identity information of a cell group that the user equipment belongs to and identity information of a logical channel group corresponding to the buffer status report.

18. A user equipment, comprising:
a processor; and
a memory for storing instructions executable by the processor;
wherein the processor is configured to:
trigger a buffer status report;
in response to triggering the buffer status report, determine an amount of data buffered in a buffer corresponding to a logical channel group configured to transmit the data; and
determine a plurality of first data amount ranges based on at least one first reference data amount, wherein the plurality of first data amount ranges respectively correspond to different first formats;
determine a target first data amount range, wherein the amount of the data buffered in the buffer locates in the target first data amount range;
search for a target first format corresponding to the target first data amount range; and
set a format for the buffer status report to the target first format;
wherein a number of bits in the buffer status report of the format is positively correlated with the amount of the data buffered in the buffer, and the bits indicate the amount of the data stored in the buffer.

19. A base station, comprising:
a processor; and
a memory for storing instructions executable by the processor;
wherein the processor is configured to:
send indication information to a user equipment, wherein the indication information comprises at least one reference data amount and enables the user equipment to determine a plurality of data amount ranges respectively corresponding to different formats based on the at least one reference data amount, wherein a target format for a buffer status report to be sent is determined by the user equipment through determining a target data amount range in which an amount of data buffered in a buffer locates and searching for the target format corresponding to the target data amount range; and
receive the buffer status report sent by the user equipment.

* * * * *